US012657315B2

(12) United States Patent
Peeters

(10) Patent No.: US 12,657,315 B2
(45) Date of Patent: Jun. 16, 2026

(54) METHODS, SYSTEMS, AND APPARATUSES FOR IMPROVING DATA ENCRYPTION

(71) Applicant: STMicroelectronics International N.V., Geneva (CH)

(72) Inventor: Michael Peeters, Tourinnes-la-Grosse (BE)

(73) Assignee: STMicroelectronics Belgium, Machelen (BE)

(*) Notice: Subject to any disclaimer, the term of this patent is extended or adjusted under 35 U.S.C. 154(b) by 221 days.

(21) Appl. No.: 18/483,278

(22) Filed: Oct. 9, 2023

(65) Prior Publication Data

US 2025/0117499 A1 Apr. 10, 2025

(51) Int. Cl.
*G06F 21/79* (2013.01)
*G06F 21/60* (2013.01)
*H04L 9/08* (2006.01)

(52) U.S. Cl.
CPC ............ *G06F 21/602* (2013.01); *G06F 21/79* (2013.01); *G06F 21/60* (2013.01); *H04L 9/08* (2013.01); *H04L 9/0891* (2013.01)

(58) Field of Classification Search
CPC ....... H04L 9/0891; H04L 9/08; G06F 21/602; G06F 21/78; G06F 21/79
See application file for complete search history.

(56) References Cited

U.S. PATENT DOCUMENTS

| | | | | |
|---|---|---|---|---|
| 9,612,978 | B2* | 4/2017 | Camp | G06F 11/1666 |
| 2014/0181532 | A1 | 6/2014 | Camp | |
| 2019/0097798 | A1 | 3/2019 | Hunt et al. | |
| 2019/0227884 | A1* | 7/2019 | Li | G06F 11/1471 |
| 2020/0266829 | A1* | 8/2020 | Evans | H03M 7/6011 |
| 2025/0085881 | A1* | 3/2025 | Modave | G06F 3/0623 |

FOREIGN PATENT DOCUMENTS

JP 2014194734 A * 10/2014 ........... G06F 21/602

OTHER PUBLICATIONS

"Flash 101: Errors in NAND Flash"—Avinash Aravindan, Embedded, Dec. 4, 2018 https://www.embedded.com/flash-101-errors-in-nand-flash/ (Year: 2018).*
"New Technique Offers Faster Security for Non-Volatile Memory Tech"—Awad et al., NC State Univ., Electrical and Computer Engineering, Apr. 6, 2022 https://ece.ncsu.edu/2022/new-technique-offers-faster-security-for-non-volatile-memory-tech/ (Year: 2022).*
EP Application No. 24204426.1, extended European Search Report mailed Feb. 26, 2025.

* cited by examiner

*Primary Examiner* — Randy A Scott
(74) *Attorney, Agent, or Firm* — Alston & Bird LLP

(57) ABSTRACT

Various examples in accordance with the present disclosure provide example methods, systems, and apparatuses for data encryption.

20 Claims, 17 Drawing Sheets

900

| | t[0] | t[1] |
|---|---|---|
| 901 — C[0] = READ (addr [i] [0]) | | |
| 903 — C[1] = READ (addr [i] [1]) | | |
| 905 — PROG (addr [i] [0], C[1]) | t[0] > t[1] | |
| 907 — PROG (addr [i] [1], C[0]) | | t[1] > t[0] |
| 909 — tmp[0] = READ (addr [i] [0]) | t'[0] | |
| 911 — tmp[1] = READ (addr [i] [1]) | | t'[1] |
| 913 — C[0] = C[0] XOR CRC (tmp[0]) | | |
| 915 — C[1] = C[1] XOR CRC (tmp[1]) | | |
| 917 — PROG (addr [i] [0], 0) | t'[0] > 0 | |
| 919 — PROG (addr [i] [1], 0) | | t'[1] > 0 |
| 921 — tmp[0] = READ (addr [i] [0]) | t''[0] | |
| 923 — tmp[1] = READ (addr [i] [1]) | | t''[1] |
| 925 — C[0] = C[0] XOR CRC (tmp[0]) | | |
| 927 — C[1] = C[1] XOR CRC (tmp[1]) | | |
| 929 — USE 64-BIT CLICK C | | |

RECEIVE TRIGGER STRINGS — 1309

RECEIVE MASK STRINGS — 1311

GENERATE  DEFINED CLICK STRINGS — 1313

D

METHODS, SYSTEMS, AND APPARATUSES FOR IMPROVING DATA ENCRYPTION

FIELD OF THE INVENTION

Example embodiments of the present disclosure relate generally to data processing and, more particularly, to methods, systems and apparatuses that improve data encryption on data storage media (such as, but not limited to, strengthening usage ratification of sensitive material).

BACKGROUND

Applicant has identified many technical challenges and difficulties associated with data encryption.

BRIEF SUMMARY

Various embodiments described herein related to methods, apparatuses, and systems for data encryption.

In accordance with some embodiments of the present disclosure, example methods for data encryption based on a click string generation page are provided. In some embodiments, the click string generation page comprises a first non-volatile data storage media unit storing a first original trigger string. In some embodiments, the example methods comprise generating, by a processor, a first overprogrammed trigger string by performing a first overprogramming operation on the first non-volatile data storage media unit; generating, by the processor, a first click string by performing a first computation operation based at least in part on the first original trigger string and the first overprogrammed trigger string; and generating, by the processor, encrypted data storage media by performing an encryption operation on unencrypted data storage media based at least in part on the first click string.

In some embodiments of some example methods, the click string generation page comprises a second non-volatile data storage media unit that stores a second original trigger string.

In some embodiments of some example methods, generating the first overprogrammed trigger string comprises receiving, by the processor, the second original trigger string from the second non-volatile data storage media unit; and performing, by the processor, the first overprogramming operation on the first non-volatile data storage media unit based on the second original trigger string.

In some embodiments, some example methods further comprise applying a mask string on the first click string.

In some embodiments of some example methods, generating the encrypted data storage media comprises generating, by the processor, a second overprogrammed trigger string by performing a second overprogramming operation on the second non-volatile data storage media unit; generating, by the processor, a second click string by performing a second computation operation based at least in part on the second original trigger string and the second overprogrammed trigger string; and generating, by the processor, the encrypted data storage media by performing the encryption operation on the unencrypted data storage media based on the first click string and the second click string.

In some embodiments of some example methods, generating the second overprogrammed trigger string comprises: prior to generating the first overprogrammed trigger string, receiving, by the processor, the first original trigger string from the first non-volatile data storage media unit; and performing, by the processor, the second overprogramming operation on the second non-volatile data storage media unit based on the first original trigger string.

In some embodiments, some example methods further comprise applying a mask string on the second click string.

In accordance with some embodiments of the present disclosure, example computing apparatuses for data encryption based on a click string generation page are provided. In some embodiments, the click string generation page comprises a first non-volatile data storage media unit storing a first original trigger string. In some embodiments, example computing apparatuses comprise memory and one or more processors communicatively coupled to the memory. In some embodiments, the one or more processors are configured to generate a first overprogrammed trigger string by performing a first overprogramming operation on the first non-volatile data storage media unit; generate a first click string by performing a first computation operation based at least in part on the first original trigger string and the first overprogrammed trigger string; and generate encrypted data storage media by performing an encryption operation on unencrypted data storage media based at least in part on the first click string.

In some embodiments of some example computing apparatuses, the click string generation page comprises a second non-volatile data storage media unit that stores a second original trigger string.

In some embodiments of some example computing apparatuses, when generating the first overprogrammed trigger string, the one or more processors are configured to: receive the second original trigger string from the second non-volatile data storage media unit; and perform the first overprogramming operation on the first non-volatile data storage media unit based on the second original trigger string.

In some embodiments of some example computing apparatuses, the one or more processors are configured to: apply a mask string on the first click string.

In some embodiments of some example computing apparatuses, when generating the encrypted data storage media, the one or more processors are configured to: generate a second overprogrammed trigger string by performing a second overprogramming operation on the second non-volatile data storage media unit; generate a second click string by performing a second computation operation based at least in part on the second original trigger string and the second overprogrammed trigger string; and generate the encrypted data storage media by performing the encryption operation on the unencrypted data storage media based on the first click string and the second click string.

In some embodiments of some example computing apparatuses, when generating the second overprogrammed trigger string, the one or more processors are configured to: prior to generating the first overprogrammed trigger string, receive the first original trigger string from the first non-volatile data storage media unit; and perform the second overprogramming operation on the second non-volatile data storage media unit based on the first original trigger string.

In some embodiments of some example computing apparatuses, the one or more processors are configured to: apply a mask string on the second click string.

In accordance with various embodiments of the present disclosure, one or more non-transitory computer-readable storage media for data encryption based on a click string generation page are provided. In some embodiments, the click string generation page comprises a first non-volatile data storage media unit storing a first original trigger string. In some embodiments, the one or more non-transitory computer-readable storage media including instructions that, when executed by one or more processors, cause the one or more processors to generate a first overprogrammed trigger string by performing a first overprogramming operation on the first non-volatile data storage media unit; generate a first click string by performing a first computation operation based at least in part on the first original trigger string and the first overprogrammed trigger string; and generate encrypted data storage media by performing an encryption operation on unencrypted data storage media based at least in part on the first click string.

In some embodiments of some example non-transitory computer-readable storage media, the click string generation page comprises a second non-volatile data storage media unit that stores a second original trigger string.

In some embodiments of some example non-transitory computer-readable storage media, when generating the first overprogrammed trigger string, the instructions cause the one or more processors to: receive the second original trigger string from the second non-volatile data storage media unit; and perform the first overprogramming operation on the first non-volatile data storage media unit based on the second original trigger string.

In some embodiments of some example non-transitory computer-readable storage media, the instructions cause the one or more processors to: apply a mask string on the first click string.

In some embodiments of some example non-transitory computer-readable storage media, when generating the encrypted data storage media, the instructions cause the one or more processors to: generate a second overprogrammed trigger string by performing a second overprogramming operation on the second non-volatile data storage media unit; generate a second click string by performing a second computation operation based at least in part on the second original trigger string and the second overprogrammed trigger string; and generate the encrypted data storage media by performing the encryption operation on the unencrypted data storage media based on the first click string and the second click string.

In some embodiments of some example non-transitory computer-readable storage media, when generating the second overprogrammed trigger string, the instructions cause the one or more processors to: prior to generating the first overprogrammed trigger string, receive the first original trigger string from the first non-volatile data storage media unit; and perform the second overprogramming operation on the second non-volatile data storage media unit based on the first original trigger string.

In some embodiments of some example non-transitory computer-readable storage media, the instructions cause the one or more processors to: apply a mask string on the second click string.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 9 provides an example data operation diagram that illustrates data operations associated with example non-volatile data storage media units of an example click string generation page in accordance with some embodiments of the present disclosure;

DETAILED DESCRIPTION OF THE INVENTION

Figure 1:
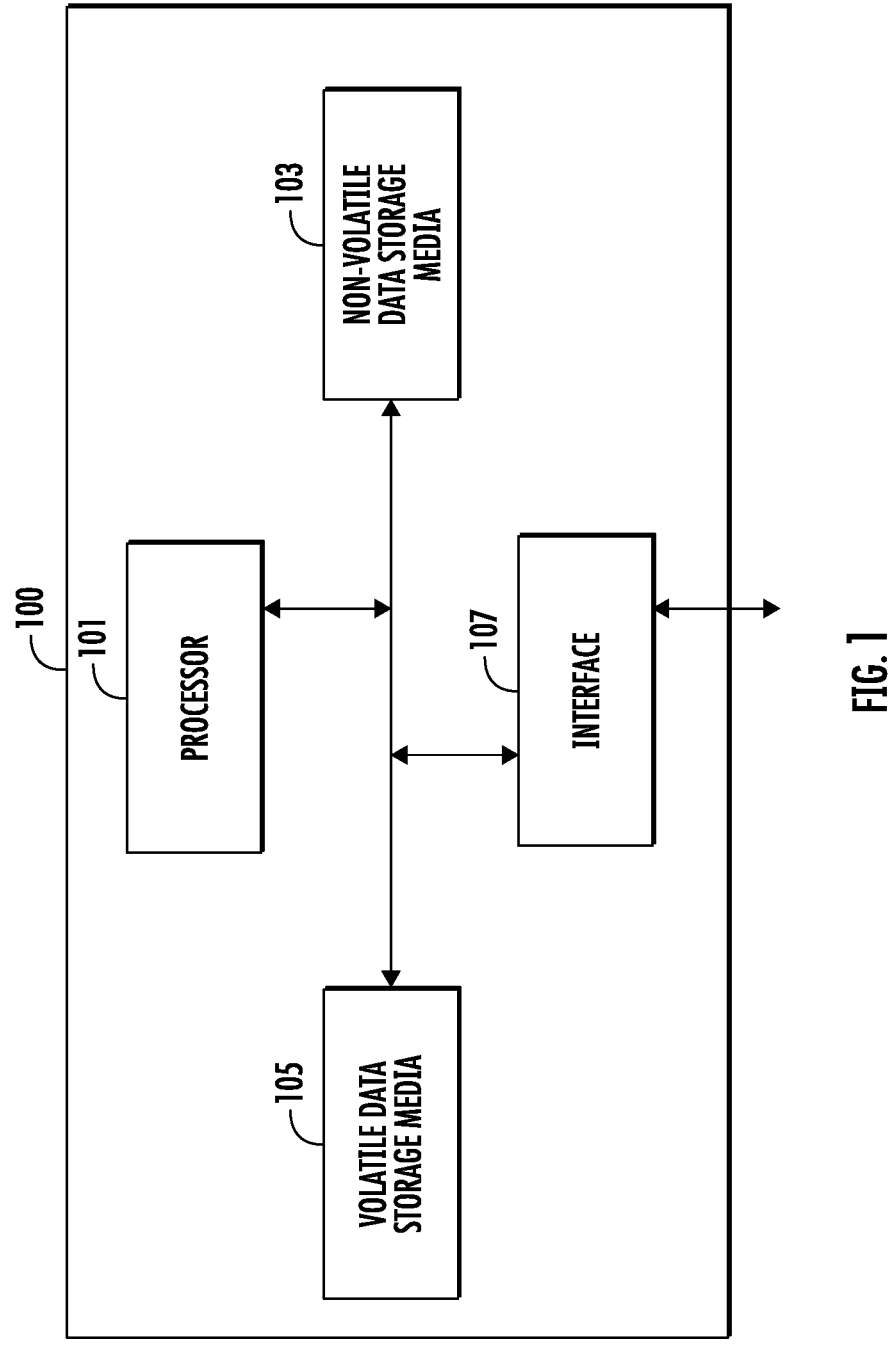
FIG. 1 provides an example schematic block diagram that illustrates example components associated with an example apparatus in accordance with some embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

As described above, there are many technical challenges and difficulties associated with data processing, such as, but not limited to, those related to data encryption on data storage media.

For example, "fault injection attacks" or "fault attacks" refer to mechanisms for attacking computing systems by deliberately introducing faults to cause computing systems to divulge secure data and/or information that are stored in such computing systems. For example, a fault injection attack on non-volatile data storage media involves intentionally introducing faults or errors into the non-volatile data storage media (for example, through manipulations of voltage, temperatures. clock frequency and/or the like) in order to disrupt the normal operation of the non-volatile data storage media and/or gain unauthorized access to secret or sensitive data stored in non-volatile data storage media.

Fault injection attacks compromise data security and pose significant challenges to data encryption on data storage media. Some methods may provide solutions such as, but not limited to, duplications, SW code integrity checks (e.g., guards), hardware (HW) integrity checks, and/or fault detection (e.g., laser detector) to address security risks caused by fault injection attacks. However, such solutions can be vulnerable to single or multi-fault attacks, and may be considered weak in some attack models (such as, but not limited to, attackers with FIB capabilities, in markets with high value, etc.).

Some methods may use ratification mechanisms to limit the usage of and/or the access to a secret/sensitive resource that is stored in the data storage unit based on a small global limit. In such methods, example ratification mechanisms may limit the usage of and/or the access to a secret/sensitive resource by, for example, but not limited to, limiting the use of a secret key, the number of times that a process accessing the secret/sensitive resource can be executed, and/or the like. As an example, example ratification mechanisms may occur as a limit on the usage for a given time period (such as, but not limited to, rate limit) or as a limit on for the lifetime of the secret/sensitive resource (e.g., global limit). However, single or multi-fault injection attacks may be carried out against ratification mechanisms. If such attacks succeed, unauthorized parties (such as, but not limited to, attackers) may gain access to secret/sensitive resource, thereby compromising data security.

As an example, ratification mechanisms may implement a secret key to unlock the secret/sensitive resource stored in the data storage media. In such an example, single or multi-fault injection attacks on ratification mechanisms may obtain or recreate such secret keys, exposing the secret/sensitive resource to unauthorized access.

Various embodiments of the present disclosure overcome these technical challenges and difficulties, and provide various technical benefits and advantages. For example, various embodiments of the present disclosure may overcome technical challenges and security risks of fault injection attacks by generating a click string that cannot be recreated after the click string is used, and may strengthen usage ratification of sensitive material. In some embodiments, example methods in accordance with the present disclosure may utilize block properties associated with non-volatile data storage media (and optionally EDC/ECC and memory encryption) to generate click strings that cannot be generated again, even in the presence of powerful attackers (such as, but not limited to, attackers with multi-fault capabilities).

In some embodiments, each click string may have a size of 64 bits, which corresponds to two words in the non-volatile data storage media. For example, various embodiments of the present disclosure may implement an example setup process that occurs only one time to generate one or more click strings. Such an example setup process may include initializing the computing device based on the click strings to protect access to secret/sensitive resources stored in the computing device. Various embodiments of the present disclosure may implement an example usage process that determines whether there is a next available click string based on a click string generation page. If the example usage process determines that there is no more available click string, the example usage process aborts, preventing further access to the secret/sensitive resource stored in the computing device. If the example usage process determines that there is an additional available click string, the example usage process generates the click string based on the click string generation page and stores the click string in RAM to unlock the secret/sensitive resource stored in the computing device. After the secret/sensitive resource is unlocked, the click string cannot be regenerated because relevant data from the click string generation page are destroyed when generating the click string.

As such, various embodiments of the present disclosure may overcome technical challenges and difficulties associated with security risks imposed by fault injection attacks. For example, various embodiments of the present disclosure may provide robust methods to implement example global limit ratification mechanisms that based on generating the click strings through non-volatile memory with separate erase/programming cycles (such as, but not limited to, EEPROM or FLASH). In some embodiments, the example ratification mechanism may be used to restrict access to sensitive resources such as data, IP block or SW functions. In some embodiments, the example ratification mechanism is strong even in presence of a powerful attacker (for example, controlled multi-fault capabilities). In some examples, the example ratification mechanisms may implement an interface that is similar to an erase-on-read memory interface (with some constraints).

As such, various embodiments of the present disclosure provide various technical benefits and advantages that include, but not limited, improved data security, additional details of which are described herein.

Referring now to FIG. 1, an example schematic diagram of an example apparatus 100 according to some embodiments of the present disclosure is illustrated.

In general, the terms "apparatus," "controller," "computing entity," "computer," "entity," "device," "system," and/or similar words used herein interchangeably refer to, for example, one or more computers, desktops, mobile phones, tablets, phablets, notebooks, laptops, distributed systems, kiosks, input terminals, servers, server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating, generating, monitoring, evaluating, comparing, and/or similar terms used herein interchangeably. In some embodiments, these functions, operations, and/or processes can be performed on data, content, information, and/or similar terms used herein interchangeably.

In some embodiments, the example apparatus 100 comprises, or is in communication with, one or more processors (also referred to as processors, processing circuitry, and/or similar terms used herein interchangeably) such as, but not limited to, the processor 101 that communicates with other elements within the example apparatus 100 (for example, but not limited to, via a bus), as shown in the example illustrated in FIG. 1. In some embodiments, the processor 101 may be embodied in a number of different ways. For example, the processor 101 may be embodied as one or more microcontrollers, microprocessors, controllers, multi-core processors, complex programmable logic devices (CPLDs), co-processing entities, application-specific instruction-set processors (ASIPs), and/or the like. Additionally, or alternatively, the processor 101 may be embodied as one or more other forms of processing devices or circuitry. In the present disclosure, the term "circuitry" may refer to an entirely hardware embodiment or a combination of hardware and computer program products. In some embodiments, the processor 101 may be embodied as integrated circuits, application specific integrated circuits (ASICs), field programmable gate arrays (FPGAs), programmable logic arrays (PLAs), hardware accelerators, other circuitry, and/or the like. In some embodiments, the processor 101 may be configured for a particular use or configured to execute instructions stored in the volatile data storage media 105, the non-volatile data storage media 103, and/or otherwise accessible to the processor 101. As such, whether configured by hardware or computer program products, or by a combination thereof, the processor 101 may be capable of performing steps or operations according to embodiments of the present disclosure when configured accordingly.

In some embodiments, the example apparatus 100 comprises, or is in communication with, non-volatile data storage media 103 (also referred to as non-volatile memory, non-volatile storage, non-volatile media, non-volatile memory storage, non-volatile memory circuitry and/or similar terms used herein interchangeably), as shown in the example illustrated in FIG. 1. In some embodiments, the non-volatile data storage media 103 may include, but not limited to, hard disks, read-only memory (ROM), programmable read-only memory (PROM), erasable programmable read-only memory (EPROM), electrically erasable programmable read-only memory (EEPROM), and/or the like. Additionally, or alternatively, in some embodiments, the non-volatile data storage media 103 may include, but not limited to, Hard Disk Drives (HDDs), Solid-State Drives (SSDs), flash memory (such as, but not limited to, Serial Flash Memory, NAND Flash Memory, NOR Flash Memory, and/or the like), multimedia memory cards (MMCs), secure digital (SD) memory cards, SmartMedia cards, Compact-Flash (CF) cards, Memory Sticks, and/or the like. Additionally, or alternatively, the non-volatile data storage media 103 may include, but not limited to, Conductive-Bridging Random Access Memory (CBRAM), Phase-change RAM (PRAM), Ferroelectric RAM (FeRAM), Non-Volatile RAM (NVRAM), Magnetic RAM (MRAM), Resistive RAM (RRAM), Silicon-Oxide-Nitride-Oxide-Silicon (SONOS), Floating Junction Gate RAM (FJG RAM), millipede memory, racetrack memory, and/or the like.

In some embodiments, the non-volatile data storage media 103 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the example apparatus 100 comprises, or is in communication with, volatile data storage media 105 (also referred to as volatile memory, volatile storage, volatile media, volatile memory storage, volatile memory circuitry and/or similar terms used herein interchangeably), as shown in the example illustrated in FIG. 1. In some embodiments, the volatile storage or memory may also include, but not limited to, random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), and/or the like. In some embodiments, the volatile data storage media 105 may be used to store at least portions of the databases, database instances, database management systems, data, applications, programs, program modules, scripts, source code, object code, byte code, compiled code, interpreted code, machine code, executable instructions, and/or the like being executed by, for example, the processor 101. Thus, the databases, database instances, database management systems, data, applications, programs, program modules, scripts, source code, object code, byte code, compiled code, interpreted code, machine code, executable instructions, and/or the like may be used to control certain aspects of the operation of the example apparatus 100 with the assistance of the processor 101.

In some embodiments, the example apparatus 100 includes one or more interfaces including, but not limited to, interface 107 for communicating with at least one processor (for example, but not limited to, the processor 101 of FIG. 1 described above), volatile data storage media (for example, but not limited to the volatile data storage media 105 of FIG. 1 described above), non-volatile data storage media (for example, but not limited to, the non-volatile data storage media 103 of FIG. 1 described above), computing entity and/or other component. For example, the interface 107 may facilitate communicating data, content, information, and/or similar terms used herein interchangeably that can be transmitted, received, operated on, processed, displayed, stored, and/or the like. In some embodiments, such communication may be executed through the interface 107 according to a wired data transmission protocol, such as, but not limited to, Double Data Rate (DDR), Peripheral Component Interconnect (PCI), PCI Express, Serial Advanced Technology Attachment (Serial ATA), Fiber Distributed Data Interface (FDDI), Digital Subscriber Line (DSL), Ethernet, Asynchronous Transfer Mode (ATM), Non-Volatile Memory Express (NVMe), Small Computer system Interface (SCSI), Inter-Integrated Circuit (I2C), Serial Peripheral Interface (SPI), Universal Serial Bus (USB), frame relay, Data Over Cable Service Interface Specification (DOCSIS), and/or any other wired transmission protocol. Additionally, or alternatively, in some embodiments, the interface 107 may be configured to communicate via wireless external communication networks using any of a variety of protocols, such as, but not limited to, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), Ultra-Wideband (UWB), infrared (IR) protocols, Near Field Communication (NFC) protocols, Wibree, Bluetooth protocols, wireless USB protocols, and/or any other wireless protocol.

While the description above provides example components of an example apparatus in accordance with some embodiments of the present disclosure, it is noted that the scope of the present disclosure is not limited to the description above. In some examples, an example apparatus 100 may comprise one or more additional and/or alternative components. For example, the example apparatus 100 may include, or be in communication with, one or more input elements such as, but not limited to, a keyboard input, a mouse input, a touch screen/display input, a motion input, a movement input, an audio input, a pointing device input, a joystick input, a keypad input, and/or the like. Additionally, or alternatively, the example apparatus 100 may include, or be in communication with, one or more output components such as, but not limited to, an audio output, a video output, a screen/display output, a motion output, a movement output, and/or the like. Additionally, or alternatively, the example apparatus 100 may include, or be in communication with, one or more other components.

Figure 2:
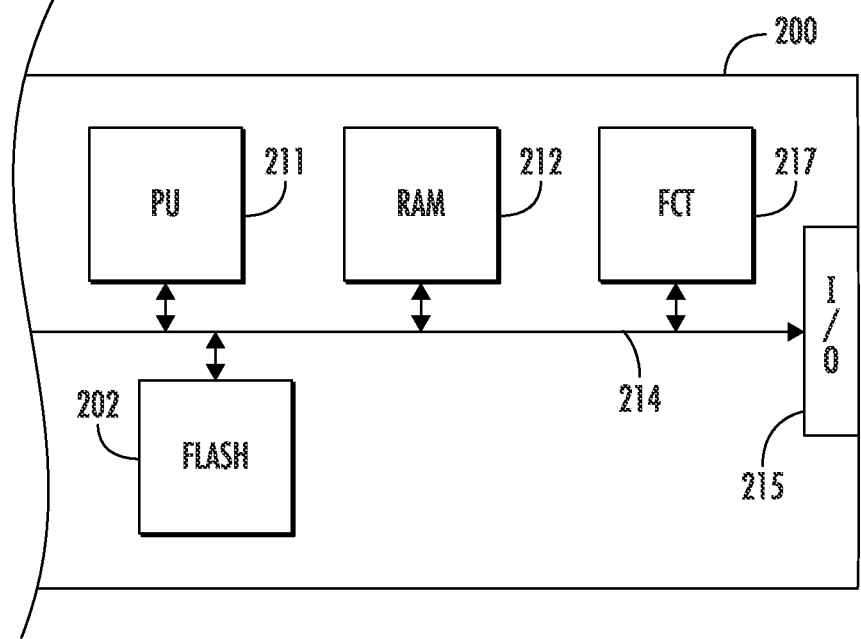
FIG. 2 provides an example electronic circuit in accordance with some embodiments of the present disclosure.

FIG. 2 schematically shows an embodiment of an electronic circuit 200 in the form of blocks that may implement example embodiments of the present disclosure.

In some embodiments, the electronic circuit 200 comprises a processing unit 211 (PU) for example, a state machine, a microprocessor, a programmable logic circuit, etc. In some embodiments, the electronic circuit 200 comprises one or more volatile storage areas 212 (for example, of RAM or register type) to temporarily store information (such as, but not limited to, instructions, addresses, data) during the processing. In some embodiments, the electronic circuit 200 comprises one or more non-volatile storage areas, including at least one flash-type memory 202 (FLASH) for durably storing information, in particular when the circuit is not powered. In some embodiments, the electronic circuit 200 comprises one or more data, address, and/or control buses 214 between the different elements internal to the electronic circuit 200. In some embodiments, the electronic circuit 200 comprises an input/output interface 215 (I/O) for communication (for example, of series bus type) with the outside of the electronic circuit 200.

In some embodiments, the electronic circuit 200 may integrate other functions, symbolized by a block 217 (as such functional circuit (FCT)), according to the application, for example, a crypto-processor, other interfaces, other memories, etc.

Various example methods described herein, including, for example, those as shown in FIG. 3 to FIG. 14B, may provide various technical advantages and/or improvements described above.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 3 to FIG. 14B may be embodied by computer program instructions, which may be stored by a non-transitory memory of an apparatus employing an embodiment of the present disclosure and executed by a processor in the apparatus.

These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

In the present disclosure, the term "data storage media unit" refers to a base unit for storing data and/or information. As an example, a data storage media unit may represent the smallest meaningful entity that a processor may manipulate or manage. In such an example, the size of the data storage media unit may correspond to the size of data that can be programmed by a processor through a single operation.

In the context of non-volatile data storage media, a "non-volatile data storage media unit" refers to a basic unit of data and/or information storage in non-volatile data storage media (such as, but not limited to, the non-volatile data storage media 103 described above in connection with FIG. 3). As an example, a non-volatile data storage media unit may represent the smallest meaningful entity that a processor may manipulate or manage in the non-volatile data storage media. In such an example, the size of the non-volatile data storage media unit may correspond to the size of data that can be programmed by a processor in the non-volatile data storage media through a single operation.

In the present disclosure, the term "page" refers to a set or a collection of one or more consecutive data storage media units in the data storage media. For example, an example page may comprise a plurality of data storage media units that is associated with consecutive data storage media addresses (for example, but not limited to, consecutive memory addresses).

In the present disclosure, the term "click string generation page" refers to a type of page that stores data and/or information for generating one or more click strings. For example, an example click string generation page may comprise a plurality of non-volatile data storage media units. In some embodiments, a non-volatile data storage media unit is the smallest writeable unit. In such embodiments, no more than one trigger string can be stored in a non-volatile data storage media unit due the need to overprogram that non-volatile data storage media unit when accessing the click string, additional details of which are described herein. In some embodiments, a trigger string is stored in one or more non-volatile data storage media units, additional details of which are described herein.

In the present disclosure, the terms "string" and "word" may be used interchangeably to refer to a contiguous sequence of data and/or information (such as, but not limited to, one or more digits, one or more binary values, and/or the like) that functions as a basic unit of data and/or information in data storage media (such as, but not limited to, the non-volatile data storage media 103 described above in connection with FIG. 3).

In the present disclosure, the term "overprogramming operation" refers to a data operation that program data and/or information on a data storage media unit (such as, but not limited to, a non-volatile data storage media unit) that already stores data and/or information. For example, an example overprogramming operation in the example non-volatile data storage media may be implemented through a PROGRAM cycle.

For example, example non-volatile data storage media such as, but not limited to, non-volatile memory, may support separate ERASE and PROGRAM cycles. In terms of granularity, the PROGRAM cycle granularity may be a byte or a word (for example, 32 bits), and the ERASE cycle granularity may depend on the non-volatile data storage media (such as, but not limited to, byte or word if the non-volatile data storage media is EEPROM, a page or a block if the non-volatile data storage media is FLASH, and/or the like). Continuing in this example, when an ERASE cycle is carried out on a non-volatile data storage media unit, the ERASE cycle may reset all the bits in the non-volatile data storage media unit to the ERASE value (for example, but not limited to, one ("1")). In contrast, when a PROGRAM cycle is carried out on a non-volatile data storage media unit, the PROGRAM cycle may set certain selected bits in the non-volatile data storage media unit to the PROGRAM value (for example, but not limited to, zero ("0")) and leaves unchanged bits in the non-volatile data storage media unit that are already set to zero ("0"). As illustrated in this example, the PROGRAM cycle may act as a bitwise AND operation on the physical bits of the non-volatile data storage media unit.

Continuing in this example, an example processor may carry out an overprogramming operation by executing a PROGRAM cycle on a non-volatile data storage media unit that already has stored data. For example, the following example program codes illustrates an example overprogramming operation through PROGRAM cycles:

```
ERASE (addr)
PROG (addr,x1)
PROG (addr,x2)
```

In the above example, the non-volatile data storage media unit with the memory address "addr" is first programmed with a string x1 and then overprogrammed with a string x2. If the string x1 is the same as the string x2, the overprogramming operation may also be referred to as a stabilizing operation because the string stored in the non-volatile data storage media unit does not change. If the string x1 is different from the string x2, the overprogramming operation may also be referred to as an overwriting operation because the string stored in the non-volatile data storage media unit changes.

In accordance with various embodiments of the present disclosure, example non-volatile data storage media may provide functions and/or features such as, but not limited to, Error Detection Code (EDC), Error Correction Code (ECC), and/or data encryption that may affect strings in such example non-volatile data storage media after overprogramming operations are carried out on such example non-volatile data storage media.

In some embodiments, the EDC may indicate whether a string stored in the non-volatile data storage media unit has been modified since the last time that the non-volatile data storage media unit has been programmed. The ECC may restore a modified string to its programed value. Both EDC and ECC require extract bits per string (for example, one plus six bits per 32 bits) and may fail if there are too many error bits. The following example programming codes illustrates example addition of EDC and ECC when a PRO-GRAM cycle is carried out in the non-volatile data storage media unit with the address "addr" to program the string x.

PROG (addr,x)→PROGPHYS (x‖EDC (addr,x)‖ECC(x))

In some embodiments, the ECC may change the string stored in the non-volatile data storage media unit when an overprogramming operation (for example, an overwriting operation) is performed on the non-volatile data storage media unit. However, performing the same overprogramming operation (for example, an overwriting operation) at two different non-volatile data storage media units may result in the two non-volatile data storage media units storing the same string (if EDC errors are ignored). The following example programming codes illustrate such an example:

```
PROG(addrA,x1), PROG(addrA,x2)
PROG(addrB,x1), PROG(addrB,x2)
READ(addrA) = READ(addrB) # if we ignore EDC errors
```

In some embodiments, memory encryption features provided by non-volatile data storage media may use a global encryption key and the address of the non-volatile data storage media unit as a diversifier. The following example programming codes illustrate an example PROGRAM cycle on a non-volatile data storage media unit when memory encryption is implemented:

PROG (addr,x)→PROGPHYS (addr, ENC (key,addr,x))

In some embodiments, memory encryption may be done by applying a XOR operation with a mask string to the string before the PROGRAM cycle, as illustrated in the following example programing codes:

PROG (addr,x)→PROGPHYS (addr, x XOR mask (key, addr)).

Continuing from the example above, memory encryption may cause overprogramming operations (such as, but not limited to, overwriting operations) at different non-volatile data storage media units to yield different results, even if simple masking is implemented. The following example programing codes illustrate such an example:

```
Let mA = mask(key,addrA), and mB = mask(key,addrB)

PROG(addrA,x1), PROG(addrA,x2), READ(addrA) = (x1 XOR mA) . (x2 XOR mA)

XOR mA = x1.x2 XOR (x1 XOR x2).mA

PROG(addrB,x1), PROG(addrB,x2), READ(addrB) = (x1 XOR mB) . (x2 XOR mB)

XOR mB = x1.x2 XOR (x1 XOR x2).mB

//if x2 = 0, then PROG(addr,x), PROG(addr,0), READ(addr) = x.m, so this returns the bits of the secret mask m using x as a selection vector.
```

In some embodiments, ECC and/or EDC may be computed over masked values from the memory encryption, as illustrated in the following example programming codes:

```
PROG(addr,x) -> PROGPHYS(addr, y ‖ EDC(addr,y) ‖ ECC(y)), where y = x XOR mask(key,addr)
```

As illustrated in various examples above, an example overprogramming operation on a non-volatile data storage media unit may destroy the string that has been previously stored in the non-volatile data storage media unit. Various embodiments of the present disclosure may utilize overprogramming operations to generate click strings based on trigger strings stored in the non-volatile data storage media units through overprogramming operations on the non-volatile data storage media units, thereby destroying the trigger strings such that they cannot be used to generate the click strings again, providing technical benefits and advantages such as, but not limited to, improved data security.

Figure 3:
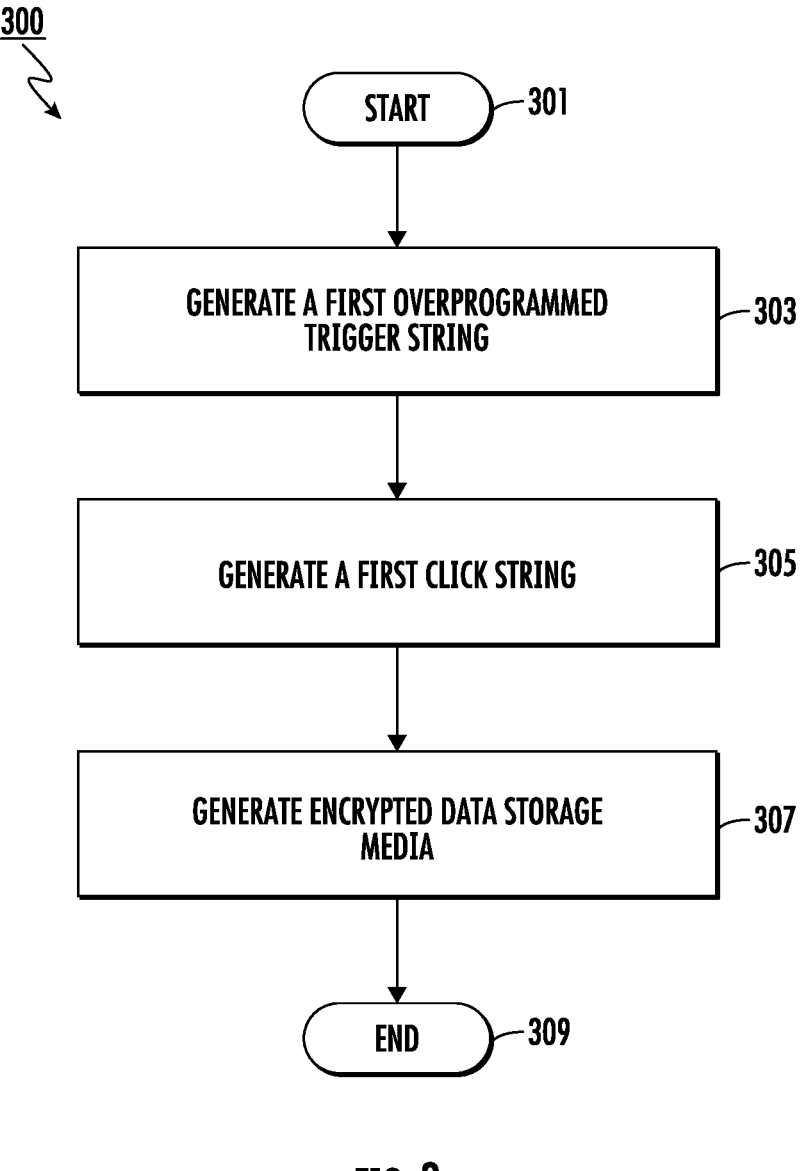
FIG. 3 provides an example flow diagram that illustrates example steps and/or example operations associated with example methods in accordance with some embodiments of the present disclosure.

Referring now to FIG. 3, an example flow diagram 300 illustrates example steps and/or example operations associated with example methods in accordance with some embodiments of the present disclosure.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example methods in accordance with example flow diagrams shown in FIG. 3 may facilitate generating one or more click strings that cannot be regenerated through fault injection attacks. As such, example methods in accordance with example flow diagrams shown in FIG. 3 may provide various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

In the example shown in FIG. 3, example methods in accordance with some embodiments of the present disclosure start at step/operation 301. Subsequent to and/or in response to step/operation 301, some example methods in accordance with some embodiments of the present disclosure proceed to step/operation 303. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate a first overprogrammed trigger string at step/operation 303.

In some embodiments, the example processor may generate the first overprogrammed trigger string by performing a first overprogramming operation on a first non-volatile data storage media unit from a click string generation page.

As described above, the click string generation page may comprise a plurality of non-volatile data storage media units that store original trigger strings. For example, the click string generation page may comprise a first non-volatile data storage media unit that stores a first original trigger string.

In the present disclosure, the term "original trigger string" refers to a string that is originally stored in a non-volatile data storage media unit from a click string generation page. In some embodiments, the original trigger string may be used to generate a click string based on performing an overprogramming operation on the non-volatile data storage media unit. In such embodiments, the overprogramming operation overwrites the original trigger string in the non-volatile data storage media unit with an overprogrammed trigger string, thereby destroying the original trigger string. In addition, destroying the original trigger string must be done in order to generate the final click string as there is no other way to generate the final click string other than overprogramming the original trigger string and reading back the results. One of the reasons is that the result of overprogramming typically depends on the address because of memory encryption.

In the present disclosure, the term "overprogrammed trigger string" refers to a string that is generated based on performing an overprogramming operation on a non-volatile data storage media unit that stores an original trigger string. In some embodiments, when an example processor performs an overprogramming operation on the non-volatile data storage media unit that already stores an original trigger string, the example processor may carry out a PROGRAM cycle at the address of the non-volatile data storage media unit, and the PROGRAM cycle may effectively perform an AND operation between the original trigger string and one or more other strings to generate the overprogrammed trigger string (or any other side-effects as described above) and replace the original trigger string in the non-volatile data storage media unit with the overprogrammed trigger string. Additional details associated with generating the overprogrammed trigger string are described herein.

Referring back to FIG. 3, subsequent to and/or in response to step/operation 303, some example methods in accordance with some embodiments of the present disclosure proceed to step/operation 305. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate a first click string at step/operation 305.

In some embodiments, the example processor may generate the first click string by performing a first computation operation based at least in part on the first original trigger string that is originally stored in the first non-volatile data storage media unit and the first overprogrammed trigger string generated at step/operation 303. In accordance with some embodiments of the present disclosure, example computation operations may include, but are not limited to, AND operations, OR operations, NAND operations, XOR operations, NOR operations, and/or the like.

In the present disclosure, the term "AND operation" refers to a type of data operation that determines whether all inputs (for example, binary bits) are one (1). If one of the inputs is zero (0), the output from the AND operation is zero (0). If all inputs are one (1), the output from the AND operation is one (1).

In the present disclosure, the term "OR operation" refers to a type of data operation that determines whether at least one input (for example, at least one binary bit) is one (1). If one of the inputs is one (1), the output from the OR operation is one (1). If none of the inputs is one (1), the output from the OR operation is zero (0).

In the present disclosure, the terms "NAND" and "not AND" refer to a type of data operation that determines whether all inputs (for example, binary bits) are one (0). If one of the inputs is zero (0), the output from the AND operation is one (1). If all inputs are one (1), the output from the NAND operation is zero (0).

In such an example, the term "NOR" refers to a type of data operation that determines whether inputs (for example, binary bits) include at least one (1). If one of the inputs is one (1), the output from the NOR operation is zero (0). If all inputs are zero (0), the output from the NOR operation is one (1).

In the present disclosure, the terms "XOR" and "exclusive OR" refer to a type of data operation that compares two inputs (for example, two binary bits) and produce an output based on the difference between the two inputs. If the two inputs are identical (for example, if both inputs are zeros (0s) or both inputs are ones (1s)), the XOR operation returns zero (0). If the two inputs are different (for example, if one input is zero (0) and one input is one (1)), the XOR operation returns one (1)).

For example, the example processor may generate the first click string by performing an XOR operation based at least in part on the first original trigger string that is originally stored in the first non-volatile data storage media unit and the first overprogrammed trigger string generated at step/operation 303 to generate the first click string.

Referring back to FIG. 3, subsequent to and/or in response to step/operation 305, some example methods in accordance with some embodiments of the present disclosure proceed to step/operation 307. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate encrypted data storage media at step/operation 307.

In some embodiments, the example processor may generate encrypted data storage media by performing an encryption operation on unencrypted data storage media based at least in part on the first click string. For example, an example processor may encrypt the unencrypted data storage media using the first click string generated at step/operation 305 based on, for example, but not limited to, Advanced Encryption Standard (AES), Rivest-Shamir-Adleman (RSA), and/or the like.

While the description above provides an example encryption mechanism based on click string, it is noted that the scope of the present disclosure is not limited to the description above. As an example, the unencrypted data storage media may store sensitive data and/or information that has an access limit of N times. In such an example, an example processor may encrypt the unencrypted data storage media using an encryption key based on, for example, but not limited to, AES, RSA, and may generate an N secret sharing of the encryption key. Additional details are described in connection with at least FIG. 12A to FIG. 14B.

Referring back to FIG. 3, subsequent to and/or in response to step/operation 307, some example methods in accordance with some embodiments of the present disclosure proceed to step/operation 309 and end.

Figure 4:
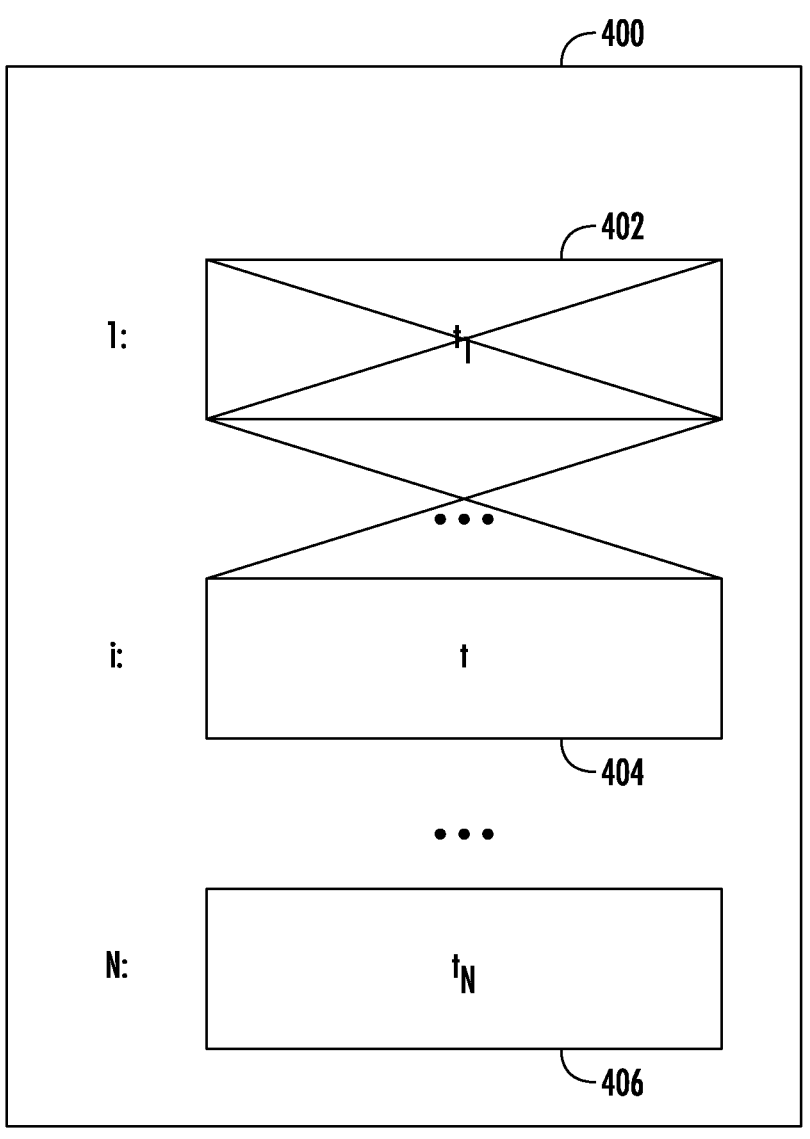
FIG. 4 provides an example schematic block diagram that illustrates example non-volatile data storage media units associated with an example click string generation page in accordance with some embodiments of the present disclosure.

Referring now to FIG. 4, an example schematic block diagram illustrates example non-volatile data storage media units associated with an example click string generation page 400 in accordance with some embodiments of the present disclosure.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example click string generation pages in accordance with the example shown in FIG. 4 may facilitate generating one or more click strings that cannot be regenerated through fault injection attacks, providing various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

For example, in the example shown in FIG. 4, the example click string generation page 400 may comprise a first non-volatile data storage media unit 402 storing a first original trigger string $t_1, \ldots,$ a $i^{th}$ non-volatile data storage media unit 404 storing a $i^{th}$ original trigger string t, $\ldots$ a $N^{th}$ non-volatile data storage media unit 406 storing a $N^{th}$ original trigger string $t_N$. In some embodiments, after the example processor performs an overprogramming operation on the first non-volatile data storage media unit 402 to generate a first overprogrammed trigger value, the value of the first original trigger string $t_1$ is destroyed.

Figure 5:
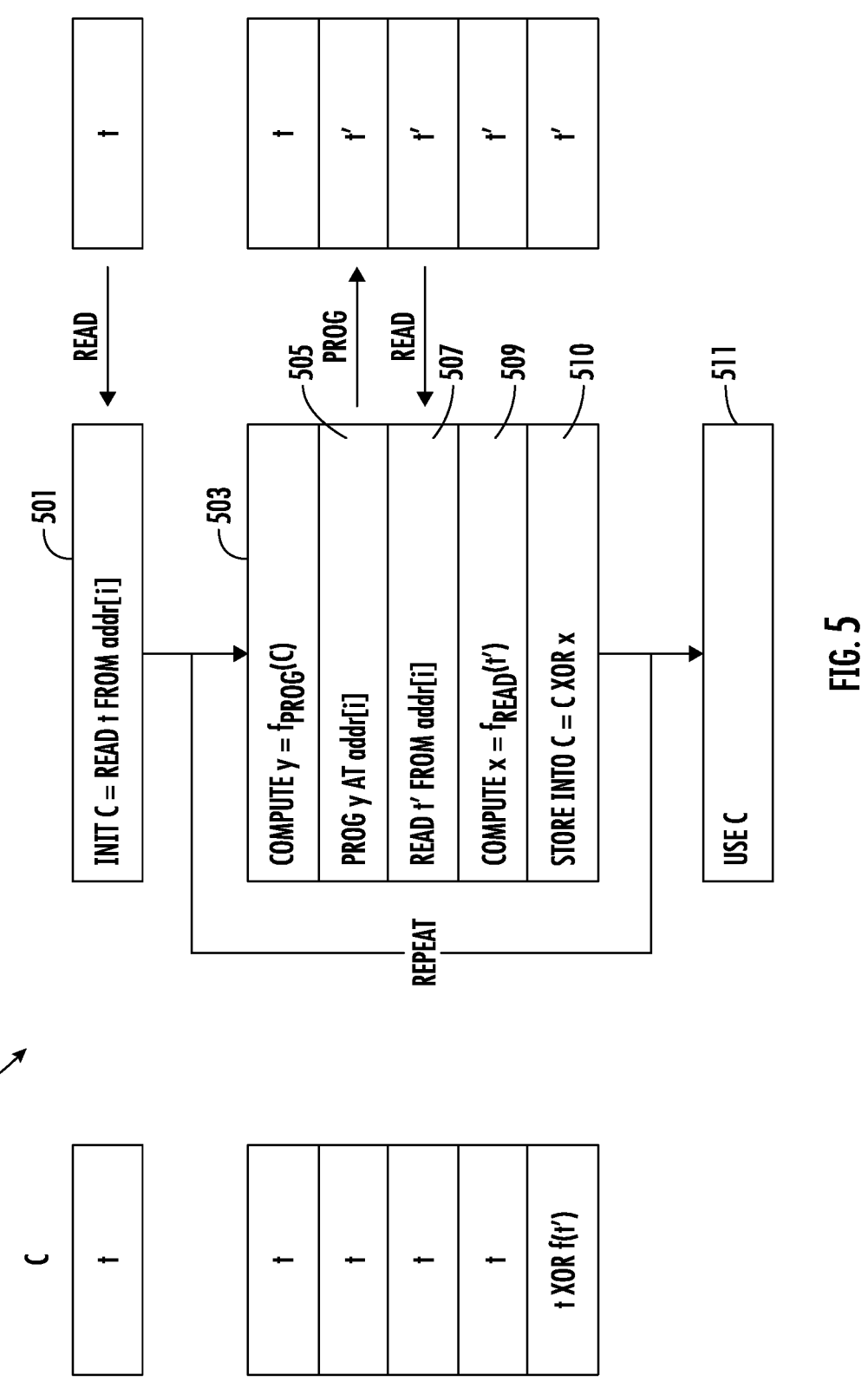
FIG. 5 provides an example data operation diagram that illustrates data operations associated with example non-volatile data storage media units of an example click string generation page in accordance with some embodiments of the present disclosure.

Referring now to FIG. 5, an example data operation diagram 500 illustrates data operations associated with example non-volatile data storage media units of an example click string generation page in accordance with some embodiments of the present disclosure.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example click string generation pages in accordance with the example shown in FIG. 5 may facilitate generating one or more click strings that cannot be regenerated through fault injection attacks, providing various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

In the example shown in FIG. 5, at step/operation 501, an example processor (such as, but not limited to, the processor 101 of the example apparatus 100 described above in connection with FIG. 1, the processing unit 211 of the example electronic circuit 200 described above in connection with FIG. 2, and/or the like) may perform a reading operation to obtain the first original trigger string t from the non-volatile data storage media unit at address addr[i], and initialize the click string C by setting the value of the click string C based on the first original trigger string t.

Continuing in this example, at step/operation 503, the example processor may apply a custom function f_PROG (possibly the identity function) on the click string C (which is the first original trigger string t) and obtain a new value y. At step/operation 505, the example processor may perform an overprogramming operation on the non-volatile data storage media unit at address addr[i] with the value y. In particular, the overprogramming operation may generate a first overprogrammed trigger string t' as a result of an AND operation between the value y (which is the first original trigger string t) and the first original trigger string t stored in the non-volatile data storage media unit at address addr[i], and may save the first overprogrammed trigger string t' to the non-volatile data storage media unit at address addr[i].

Continuing in this example, at step/operation 507, the example processor may perform a reading operation to obtain the first overprogrammed trigger string t' from the non-volatile data storage media unit at address addr[i]. At step/operation 509, the example processor may apply a custom function f_READ (possibly the identity function, or any other function such as, but not limited to, a CRC function) on the first overprogrammed trigger string t' and obtain a new value x.

Continuing in this example, at step/operation 510, the example processor may set the click string C based on performing an XOR operation between the click string C (which is the same as the first original trigger string t) and the value x (which is the first overprogrammed trigger string t'). Continuing in this example, in some embodiments, the example processor may return to step/operation 503 to repeat step/operation 505, step/operation 507, and step/operation 509 described above.

In some embodiments, at step/operation 511, the example processor may use the click string C to encrypt data storage media as described above in connection with at least step/operation 307 of FIG. 3.

Figure 6:
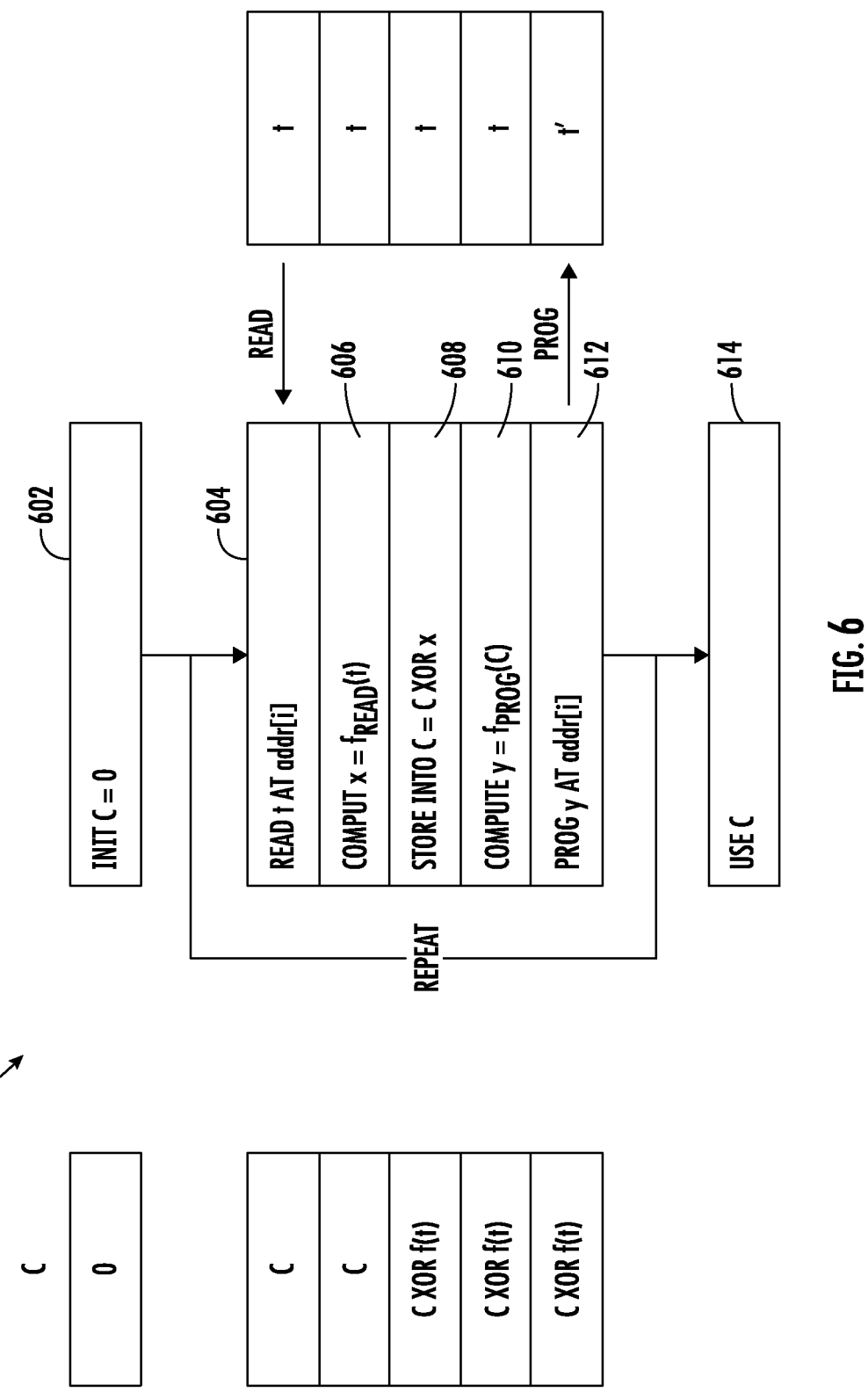
FIG. 6 provides an example data operation diagram that illustrates data operations associated with example non-volatile data storage media units of an example click string generation page in accordance with some embodiments of the present disclosure.

Referring now to FIG. 6, an example data operation diagram 600 illustrates data operations associated with example non-volatile data storage media units of an example click string generation page in accordance with some embodiments of the present disclosure.

As illustrated, the example data operation diagram 600 of FIG. 6 rewrites the example data operation diagram 500 of FIG. 5 in a different way while still obtaining the same result. For example, example click string generation pages in accordance with the example shown in FIG. 6 may facilitate generating one or more click strings that cannot be regenerated through fault injection attacks, providing various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

In the example shown in FIG. 6, at step/operation 602, an example processor (such as, but not limited to, the processor 101 of the example apparatus 100 described above in connection with FIG. 1, the processing unit 211 of the example electronic circuit 200 described above in connection with FIG. 2, and/or the like) may initialize the click string C by setting the value of the click string C as zero.

Continuing in this example, at step/operation 604, the example processor may perform a reading operation to obtain the first original trigger string t from the non-volatile data storage media unit at address addr[i]. At step/operation 606, the example processor may apply a custom function f_READ (possibly the identity function, or any other function such as, but not limited to, a CRC function) on the first overprogrammed trigger string t' and obtain a new value x.

Continuing in this example, at step/operation 608, the example processor may set the click string C based on performing an XOR operation between the click string C (which is zero) and the value x (which is the first original trigger string t).

Continuing in this example, at step/operation 610, the example processor may perform a programming operation to save the click string C to the value y. At step/operation 612, the example processor may apply a custom function f_PROG (possibly the identity function) on the click string C (which is the first original trigger string t) and obtain a new value y. Continuing in this example, in some embodiments, the example processor may return to step/operation 604 to repeat step/operation 606, step/operation 608, and step/operation 610 described above.

In some embodiments, at step/operation 614, the example processor may use the click string C to encrypt data storage media as described above in connection with at least step/operation 307 of FIG. 3.

Figure 7:
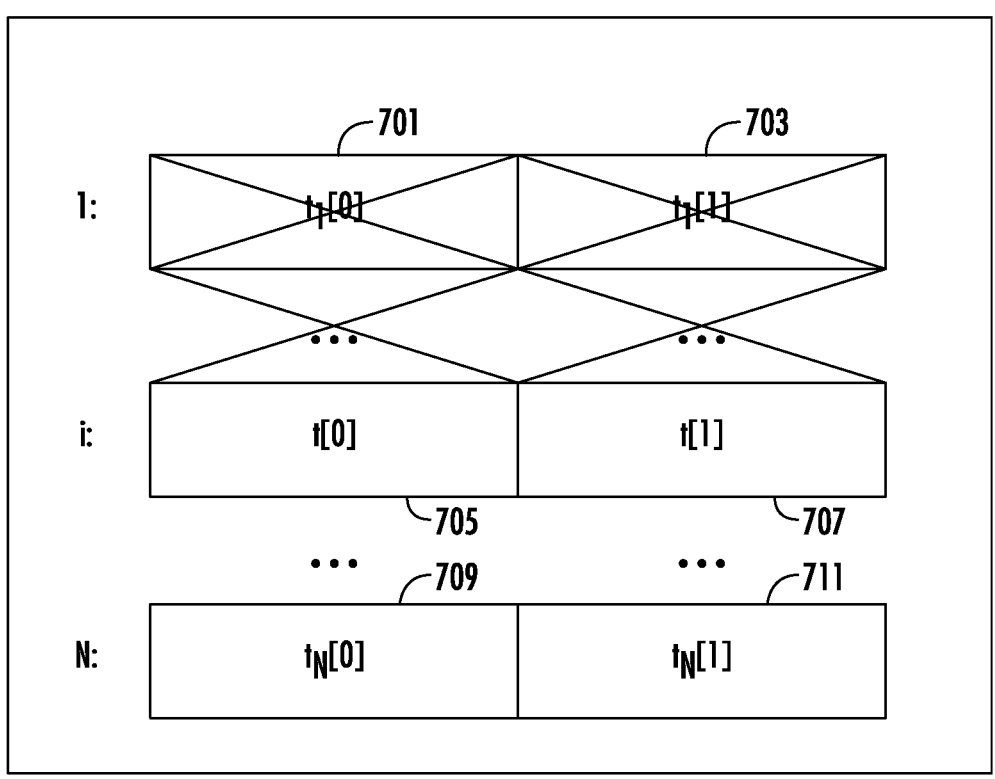
FIG. 7 provides an example schematic block diagram that illustrates example non-volatile data storage media units associated with an example click string generation page in accordance with some embodiments of the present disclosure.

Referring now to FIG. 7, an example schematic block diagram illustrates example non-volatile data storage media units associated with an example click string generation page 700 in accordance with some embodiments of the present disclosure.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example click string generation pages in accordance with the example shown in FIG. 7 may facilitate generating one or more click strings that cannot be regenerated through fault injection attacks, providing various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

In the example shown in FIG. 7, the example click string generation page 700 may comprise a first non-volatile data storage media unit 701 and a second non-volatile data storage media unit 703. In some embodiments, the first non-volatile data storage media unit 701 stores a first original trigger string $t_1$ [0] and the second non-volatile data storage media unit 703 stores a second original trigger string $t_1$ [1]. In some embodiments, the first non-volatile data storage media unit 701 and the second non-volatile data storage media unit 703 are adjacent to one another in the example click string generation page 700 of the non-volatile data storage media. In some embodiments, the first non-volatile data storage media unit 701 and the second non-volatile data storage media unit 703 are on the same page. In some embodiments, the first non-volatile data storage media unit 701 and the second non-volatile data storage media unit 703 are not adjacent to one another and/or not on the same page.

The example shown in FIG. 7 illustrates example embodiments where a single click string is generated based on two trigger strings stored in two non-volatile data storage media units that are adjacent to one another. For example, a first click string may be generated based on the first original trigger string $t_1$ [0] stored in the first non-volatile data storage media unit 701 and the second original trigger string $t_1$ [1] stored in the second non-volatile data storage media unit 703. Additionally, or alternatively, a $i^{th}$ click string may be generated based on the original trigger string t[0] stored in the non-volatile data storage media unit 705 and the original trigger string t[1] stored in the non-volatile data storage media unit 707. Additionally, or alternatively, a $N^{th}$ click string may be generated based on the original trigger string $t_N$ [0] stored in the non-volatile data storage media unit 709 and the original trigger string $t_N$ [1] stored in the non-volatile data storage media unit 711. Additional details are described herein.

Figure 8:
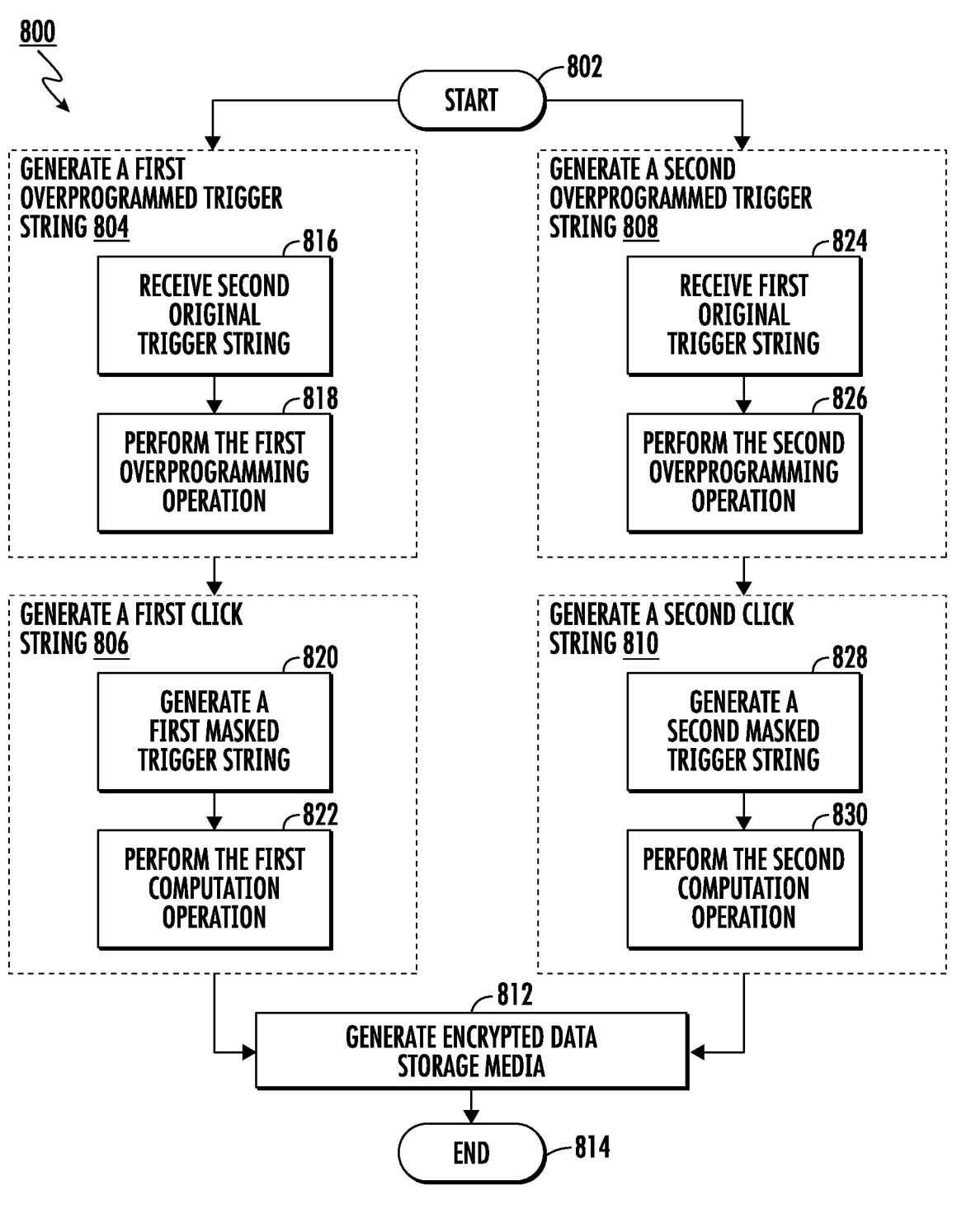
FIG. 8 provides an example flow diagram that illustrates example steps and/or example operations associated with example methods in accordance with some embodiments of the present disclosure.

Referring now to FIG. 8, an example flow diagram 800 illustrates example steps and/or example operations associated with example methods in accordance with some embodiments of the present disclosure.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example methods in accordance with example flow diagrams shown in FIG. 8 may facilitate generating one or more click strings that cannot be regenerated through fault injection attacks. As such, example methods in accordance with example flow diagrams shown in FIG. 8 may provide various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

In the example shown in FIG. 8, example methods in accordance with some embodiments of the present disclosure start at step/operation 802. Subsequent to and/or in response to step/operation 802, some example methods in accordance with some embodiments of the present disclosure proceed to step/operation 804. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate a first overprogrammed trigger string at step/operation 804.

In some embodiments, when generating the first overprogrammed trigger string at step/operation 804, an example processor may perform one or more steps and/or operations that may include, but not limited to, at least step/operation 816 and step/operation 818.

For example, an example processor (such as, but not limited to, the processor 101 of the example apparatus 100 described above in connection with FIG. 1, the processing unit 211 of the example electronic circuit 200 described above in connection with FIG. 2, and/or the like) may receive a second original trigger string at step/operation 816.

In some embodiments, the example processor may receive the second original trigger string from the second non-volatile data storage media unit. For example, in the example shown in FIG. 7, the example processor may receive the second original trigger string $t_1$ [1] from the second non-volatile data storage media unit 703.

Referring back to FIG. 8, subsequent to and/or in response to step/operation 816, some example methods in accordance with some embodiments of the present disclosure proceed to step/operation 818. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may perform the first overprogramming operation at step/operation 818.

In some embodiments, the example processor performs the first overprogramming operation on the first non-volatile data storage media unit based on the second original trigger string that is received at step/operation 816.

For example, in the example shown in FIG. 7, the example processor may perform a first overprogramming operation on the first non-volatile data storage media unit 701 based on the second original trigger string $t_1$ [1] that is stored in the second non-volatile data storage media unit 703. For example, the first overprogramming operation may generate a first overprogrammed trigger string that is the result of an AND operation between the second original trigger string $t_1$ [1] and the first original trigger string $t_1$ [0], and may save the first overprogrammed trigger string in first non-volatile data storage media unit 701.

Referring back to FIG. 8, subsequent to and/or in response to step/operation 804, some example methods in accordance with some embodiments of the present disclosure proceed to step/operation 806. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate a first click string at step/operation 806.

In some embodiments, when generating the first click string at step/operation 806, an example processor may perform one or more steps and/or operations that may include, but not limited to, at least step/operation 820 and step/operation 822.

In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate a first masked trigger string at step/operation 820.

In some embodiments, the example processor generates the first masked trigger string by performing a first mask operation based on the first overprogrammed trigger string that is generated at step/operation 818. For example, the example processor may perform an XOR operation between the first overprogrammed trigger string and the first original trigger string to generate the first masked trigger string.

Referring back to FIG. 8, subsequent to and/or in response to step/operation 820, some example methods in accordance with some embodiments of the present disclosure proceed to step/operation 822. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may perform the first computation operation at step/operation 822.

In some embodiments, the example processor performs the first computation operation based on the first original trigger string that is originally stored in the first non-volatile data storage media unit and the first masked trigger string that is generated at step/operation 820. For example, the example processor may perform an XOR operation between the first original trigger string and the first masked trigger string to generate the first click string.

Subsequent to and/or in response to step/operation 802, some example methods in accordance with some embodiments of the present disclosure proceed to step/operation 808. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate a second overprogrammed trigger string at step/operation 808.

In some embodiments, when generating the second overprogrammed trigger string at step/operation 808, an example processor may perform one or more steps and/or operations that may include, but not limited to, at least step/operation 824 and step/operation 826.

In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may receive a first original trigger string at step/operation 824.

In some embodiments, the example processor may receive the first original trigger string from the first non-volatile data storage media unit prior to generating the first overprogrammed trigger string at step/operation 804 and/or step/operation 818 (because generating the first overprogrammed trigger string destroys the first original trigger string in the first non-volatile data storage media unit). For example, in the example shown in FIG. 7, the example processor may receive the first original trigger string $t_1$ [0] from the first non-volatile data storage media unit 701 prior to overprogramming the first non-volatile data storage media unit 701.

Referring back to FIG. 8, subsequent to and/or in response to step/operation 824, some example methods in accordance with some embodiments of the present disclosure proceed to step/operation 826. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may perform the second overprogramming operation at step/operation 826.

In some embodiments, the example processor performs the second overprogramming operation on the second non-volatile data storage media unit based on the first original trigger string that is received at step/operation 824 to generate the second overprogrammed trigger string.

For example, in the example shown in FIG. 7, the example processor may perform a second overprogramming operation on the second non-volatile data storage media unit 703 based on the first original trigger string $t_1$ [0] that is stored in the first non-volatile data storage media unit 701. For example, the second overprogramming operation may generate a second overprogrammed trigger string that is the result of an AND operation between the first original trigger string $t_1$ [0] and the second original trigger string $t_1$ [1], and may save the second overprogrammed trigger string in second non-volatile data storage media unit 703.

Referring back to FIG. 8, subsequent to and/or in response to step/operation 808, some example methods in accordance with some embodiments of the present disclosure proceed to step/operation 810. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate a second click string at step/operation 810.

In some embodiments, when generating the second click string at step/operation 810, an example processor may perform one or more steps and/or operations that may include, but not limited to, at least step/operation 828 and step/operation 830.

In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate a second masked trigger string at step/operation 828.

In some embodiments, the example processor generates the second masked trigger string by performing a second mask operation based on the second overprogrammed trigger string that is generated at step/operation 826. For example, the example processor may perform an XOR operation between the second overprogrammed trigger string and the second original trigger string to generate the second masked trigger string.

Referring back to FIG. 8, subsequent to and/or in response to step/operation 828, some example methods in accordance with some embodiments of the present disclosure proceed to step/operation 830. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may perform the second computation operation at step/operation 830.

In some embodiments, the example processor performs the second computation operation based on the second original trigger string that is originally stored in the second non-volatile data storage media unit and the second masked trigger string that is generated at step/operation 828.

As described above, the second masked trigger string may be generated based at least in part on the second overprogrammed trigger string. As such, the example processor may generate the second click string by performing a second computation operation based at least in part on the second original trigger string and the second overprogrammed trigger string.

For example, the example processor may perform an XOR operation between the second original trigger string and the second masked trigger string to generate the second click string.

Referring back to FIG. 8, subsequent to and/or in response to step/operation 806 and step/operation 810, some example methods in accordance with some embodiments of the present disclosure proceed to step/operation 830. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate encrypted data storage media at step/operation 812.

In some embodiments, the example processor may generate the encrypted data storage media by performing the encryption operation on the unencrypted data storage media based on the first click string generated in connection with step/operation 806 and the second click string generated in connection with step/operation 810. For example, the example processor may combine the first click string and the second click string (for example, appending the second click string to the first click string), and then encrypt the unencrypted data storage media based on the combination of the first click string and the second click string, similar to those described above in connection with at least step/operation 307 of FIG. 3.

Referring back to FIG. 8, subsequent to and/or in response to step/operation 812, some example methods in accordance with some embodiments of the present disclosure proceed to step/operation 814 and end.

Referring now to FIG. 9, an example data operation diagram 900 illustrates data operations associated with example non-volatile data storage media units of an example click string generation page in accordance with some embodiments of the present disclosure.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example click string generation page in accordance with example shown in FIG. 9 may facilitate generating one or more click strings that cannot be regenerated through fault injection attacks, providing various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

In the example shown in FIG. 9, an example click string generation page includes a first non-volatile data storage media unit at address addr[i][0] and a second non-volatile data storage media unit at address addr[i][1] that are adjacent to one another. In particular, the first non-volatile data storage media unit stores the first original trigger value t[0], and the second non-volatile data storage media unit stores the second original trigger value t[1].

At step/operation 901, an example processor (such as, but not limited to, the processor 101 of the example apparatus 100 described above in connection with FIG. 1, the processing unit 211 of the example electronic circuit 200 described above in connection with FIG. 2, and/or the like) may perform a reading operation to obtain the first original trigger string t[0] from the first non-volatile data storage media unit at address addr[i][0], and initialize the first click string C[0] based on the first original trigger string t[0]. In other words, at step/operation 901, C[0] is the same as t[0].

Subsequently, at step/operation 903, an example processor (such as, but not limited to, the processor 101 of the example apparatus 100 described above in connection with FIG. 1, the processing unit 211 of the example electronic circuit 200 described above in connection with FIG. 2, and/or the like) perform a reading operation to obtain the second original trigger string t[1] from the non-volatile data storage media unit at address addr[i][1], and initialize the second click string C[1] based on the second original trigger string t[1]. In some embodiments, at step/operation 903, C[1] is the same as t[1].

Subsequently, at step/operation 905, an example processor (such as, but not limited to, the processor 101 of the example apparatus 100 described above in connection with FIG. 1, the processing unit 211 of the example electronic circuit 200 described above in connection with FIG. 2, and/or the like) may perform an overprogramming operation on the first non-volatile data storage media unit at address addr[i][0] with the second click string C[1]. As described above, the second click string C[1] is the same as the second original trigger string originally stored in the second non-volatile data storage media unit at address addr[i][1]. As such, the example processor may overwrite the first original trigger string t[0] stored in the first non-volatile data storage media unit at address addr[i][0] with the second original trigger string that has been saved to the second click string C[1].

Subsequently, at step/operation 907, an example processor (such as, but not limited to, the processor 101 of the example apparatus 100 described above in connection with FIG. 1, the processing unit 211 of the example electronic circuit 200 described above in connection with FIG. 2, and/or the like) may perform an overprogramming operation on the second non-volatile data storage media unit at address addr[i][1] with the first click string C[0]. As described above, the first click string C[0] is the same as the first original trigger string originally stored in the first non-volatile data storage media unit at address addr[i][0]. As such, the example processor may overwrite the second original trigger string t[1] stored in the second non-volatile data storage media unit at address addr[i][1] with the first original trigger string that has been saved to the first click string C[0].

Subsequently, at step/operation 909, an example processor (such as, but not limited to, the processor 101 of the example apparatus 100 described above in connection with FIG. 1, the processing unit 211 of the example electronic circuit 200 described above in connection with FIG. 2, and/or the like) may read the string t'[0] stored in the first non-volatile data storage media unit at address addr[i][0], and save the string t'[0] to a temporary memory unit tmp[0]. As described above, features associated with non-volatile data storage media (such as, but not limited to, EDC, ECC, and/or data encryption) may affect the value of the string t'[0] after the overprogramming operation on the first non-volatile data storage media unit at address addr[i][0].

Subsequently, at step/operation 911, an example processor (such as, but not limited to, the processor 101 of the example apparatus 100 described above in connection with FIG. 1, the processing unit 211 of the example electronic circuit 200 described above in connection with FIG. 2, and/or the like) may read the string t'[1] stored in the second non-volatile data storage media unit at address addr[i][1], and save the string t'[1] to a temporary memory unit tmp[1]. As described above, features associated with non-volatile data storage media (such as, but not limited to, EDC, ECC, and/or data encryption) may affect the value of the string t'[1] after the overprogramming operation on the second non-volatile data storage media unit at address addr[i][1].

Subsequently, at step/operation 913, an example processor (such as, but not limited to, the processor 101 of the example apparatus 100 described above in connection with FIG. 1, the processing unit 211 of the example electronic circuit 200 described above in connection with FIG. 2, and/or the like) may update the first click string C[0] based at least in part on performing an XOR operation between the first click string C[0] and the result of a cyclic redundancy check (CRC) operation on the temporary memory unit tmp[0] (that stores the string t'[0]). In some embodiments, at step/operation 913, C[0] is the result of t[0] XOR CRC (t'[0]).

Subsequently, at step/operation 915, an example processor (such as, but not limited to, the processor 101 of the example apparatus 100 described above in connection with FIG. 1, the processing unit 211 of the example electronic circuit 200 described above in connection with FIG. 2, and/or the like) may update the second click string C[1] based at least in part on performing an XOR operation between the second click string C[1] and the result of a CRC operation on the temporary memory unit tmp[1] (that stores the string t'[1]). In some embodiments, at step/operation 915, C[1] is the result of t[1] XOR CRC (t'[1]).

Subsequently, at step/operation 917, an example processor (such as, but not limited to, the processor 101 of the example apparatus 100 described above in connection with FIG. 1, the processing unit 211 of the example electronic circuit 200 described above in connection with FIG. 2, and/or the like) may perform an overprogramming operation on the first non-volatile data storage media unit at address addr[i][0] with the logical value 0.

Subsequently, at step/operation 919, an example processor (such as, but not limited to, the processor 101 of the example apparatus 100 described above in connection with FIG. 1, the processing unit 211 of the example electronic circuit 200 described above in connection with FIG. 2, and/or the like) may perform an overprogramming operation on the second non-volatile data storage media unit at address addr[i][1] with the logical value 0.

Subsequently, at step/operation 921, an example processor (such as, but not limited to, the processor 101 of the example apparatus 100 described above in connection with FIG. 1, the processing unit 211 of the example electronic circuit 200 described above in connection with FIG. 2, and/or the like) may read the string t"[0] stored in the first non-volatile data storage media unit at address addr[i][0], and save the string t"[0] to the temporary memory unit tmp[0]. As described above, features associated with non-volatile data storage media (such as, but not limited to, EDC, ECC, and/or data encryption) may affect the value of the string t"[0] after the overprogramming operation on the first non-volatile data storage media unit at address addr[i][0].

Subsequently, at step/operation 923, an example processor (such as, but not limited to, the processor 101 of the example apparatus 100 described above in connection with FIG. 1, the processing unit 211 of the example electronic circuit 200 described above in connection with FIG. 2, and/or the like) may read the string t"[1] stored in the second non-volatile data storage media unit at address addr[i][1], and save the string t"[1] to the temporary memory unit tmp[1]. As described above, features associated with non-volatile data storage media (such as, but not limited to, EDC, ECC, and/or data encryption) may affect the value of the string t"[1] after the overprogramming operation on the second non-volatile data storage media unit at address addr[i][1].

Subsequently, at step/operation 925, an example processor (such as, but not limited to, the processor 101 of the example apparatus 100 described above in connection with FIG. 1, the processing unit 211 of the example electronic circuit 200 described above in connection with FIG. 2, and/or the like) may perform an XOR operation between the first click string C[0] and the result of the CRC operation on the temporary memory unit tmp[0] (that stores the string t"[0]). In some embodiments, at step/operation 925, C[0] is the result of t[0] XOR CRC (t'[0]) XOR CRC (t"[0]).

Subsequently, at step/operation 927, an example processor (such as, but not limited to, the processor 101 of the example apparatus 100 described above in connection with FIG. 1, the processing unit 211 of the example electronic circuit 200 described above in connection with FIG. 2, and/or the like) may perform an XOR operation between the second click string C[1] and the result of the CRC operation on the temporary memory unit tmp[1] that stores the string t"[1]. In some embodiments, at step/operation 927, C[1] is the result of t[1] XOR CRC (t'[1]) XOR CRC (t"[1]).

Subsequently, at step/operation 929, an example processor (such as, but not limited to, the processor 101 of the example apparatus 100 described above in connection with FIG. 1, the processing unit 211 of the example electronic circuit 200 described above in connection with FIG. 2, and/or the like) may generate a click string C based on the first click string C[0] and the second click string C[1]. For example, the first click string C[0] and the second click string C[1] may each comprise 32 bits. As such, by combining the first click string C[0] and the second click string C[1], a 64-bit click string may be generated.

As illustrated in the example shown in FIG. 9, generating the click string C erases data in the non-volatile data storage media units [i][0] and [i][1] such that the click string C cannot be retrieved again, providing technical benefits and advantages such as, but not limited to, improved data security.

Figure 10:
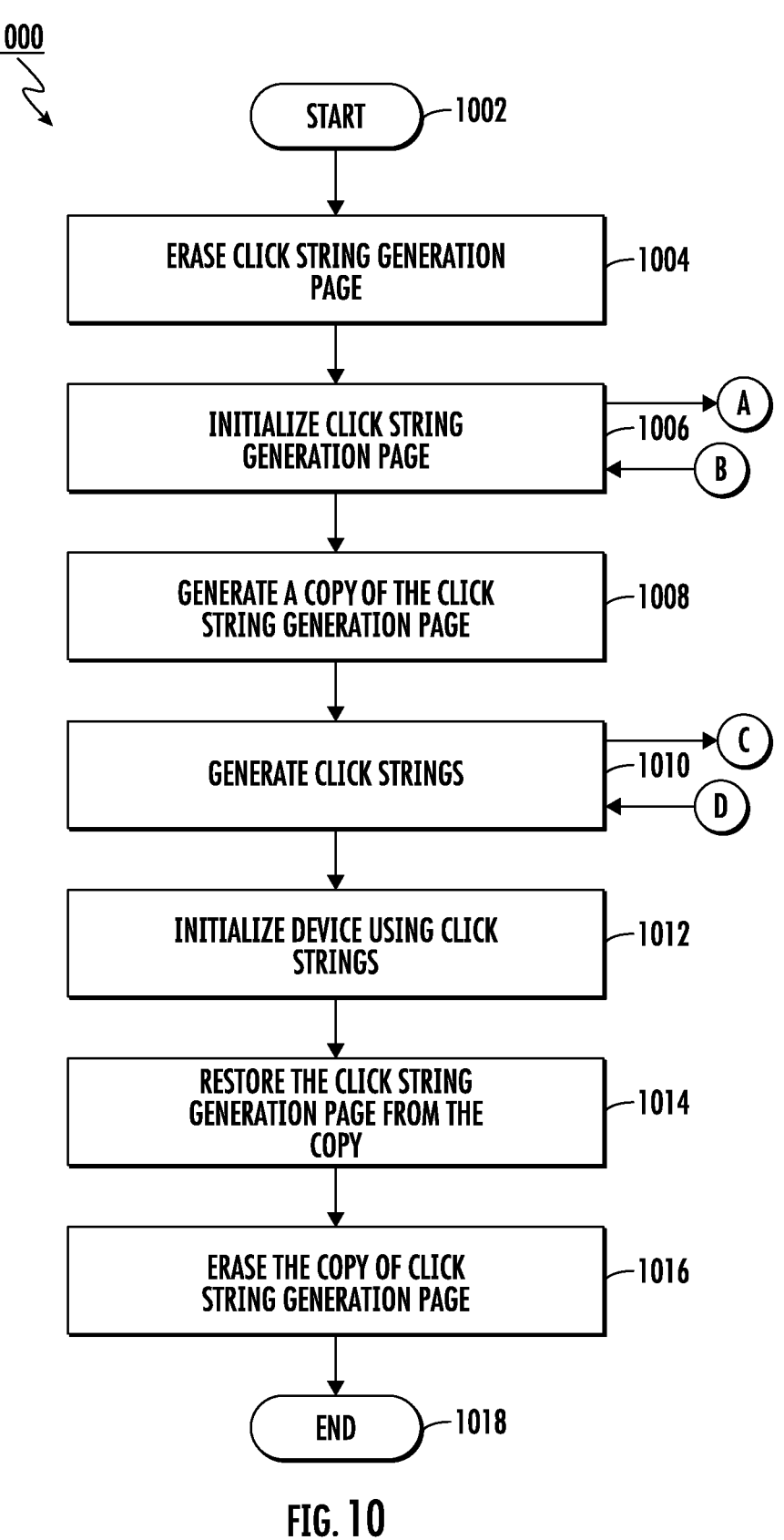
FIG. 10 provides an example flow diagram that illustrates example steps and/or example operations associated with example methods in accordance with some embodiments of the present disclosure.

Referring now to FIG. 10, an example flow diagram 1000 illustrates example steps and/or example operations associated with example methods in accordance with some embodiments of the present disclosure.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example methods in accordance with example flow diagrams shown in FIG. 10 may facilitate generating one or more click strings that cannot be regenerated through fault injection attacks. As such, example methods in accordance with example flow diagrams shown in FIG. 10 may provide various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

In the example shown in FIG. 10, example methods in accordance with some embodiments of the present disclosure start at step/operation 1002. Subsequent to and/or in response to step/operation 1002, some example methods in accordance with some embodiments of the present disclosure proceed to step/operation 1004. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may erase click string generation page at step/operation 1004.

For example, an example processor may carry out an ERASE cycle on a plurality of consecutive data storage media units in the non-volatile data storage media, and designate such data storage media units as the click string generation page.

Referring back to FIG. 10, subsequent to and/or in response to step/operation 1004, some example methods in accordance with some embodiments of the present disclosure proceed to step/operation 1006. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may initialize click string generation page at step/operation 1006.

For example, the example processor may utilize one or more random number generators to generate a plurality of random numbers, and initialize the click string generation page with the plurality of random numbers. For example, each non-volatile data storage media unit of the example click string generation page may store a random number.

While the description above provides an example of initializing the click string generation page based on random numbers, it is noted that the scope of the present disclosure is not limited to the description above. In some examples, an example method may initialize the click string generation page based on one or more mask strings, additional details of which are described in connection with at least FIG. 11 to FIG. 14B.

Referring back to FIG. 10, subsequent to and/or in response to step/operation 1006, some example methods in accordance with some embodiments of the present disclosure proceed to step/operation 1008. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate a copy of the click string generation page at step/operation 1008.

Additionally, or alternatively, an example processor may implement a deterministic pseudo-random algorithm to generate trigger strings for initializing the click string generation page at step/operation 1006. In such an example, the example processor may store the random seed for the deterministic pseudo-random algorithm in a data storage media in addition to or in alternative of generating the copy of the click string generation page at step/operation 1008.

Referring back to FIG. 10, subsequent to and/or in response to step/operation 1008, some example methods in accordance with some embodiments of the present disclosure proceed to step/operation 1010. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate click strings at step/operation 1010.

For example, various embodiments of the present disclosure may generate click strings based on the click string generation page in accordance with various example methods described herein, including, but not limited to, those described above in connection with at least FIG. 1 to FIG. 9.

In some embodiments, an example processor may generate multiple click strings. In such examples, the example processor may repeat various example methods described herein multiple times to generate the multiple click strings.

Referring back to FIG. 10, subsequent to and/or in response to step/operation 1010, some example methods in accordance with some embodiments of the present disclosure proceed to step/operation 1012. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may initialize the device using click strings at step/operation 1012.

For example, the example processor may utilize the click string generated at step/operation 1010 as encryption keys for encrypting sensitive data and/or information in the device. For example, if the device stores N different sensitive data, the example processor may repeat various example methods described herein to generate N different click strings, each serving as a separate encryption key for encrypting the sensitive data.

Referring back to FIG. 10, subsequent to and/or in response to step/operation 1012, some example methods in accordance with some embodiments of the present disclosure proceed to step/operation 1014. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may restore the click string generation page from the copy at step/operation 1014.

Continuing from the example, decryption keys may be generated based on generating click strings using the restored click string generation page. In some embodiments, decryption keys may be stored in RAM so that sensitive data may be decrypted.

Referring back to FIG. 10, subsequent to and/or in response to step/operation 1014, some example methods in accordance with some embodiments of the present disclosure proceed to step/operation 1016. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may erase the copy of click string generation page at step/operation 1016.

In some embodiments, by erasing the copy of click string generation page, various embodiments of the present disclosure may provide technical benefits and advantages such as, but not limited to, restricting access to the sensitive data by unauthorized parties.

Referring back to FIG. 10, subsequent to and/or in response to step/operation 1016, some example methods in accordance with some embodiments of the present disclosure proceed to step/operation 1018 and end.

Figure 11:
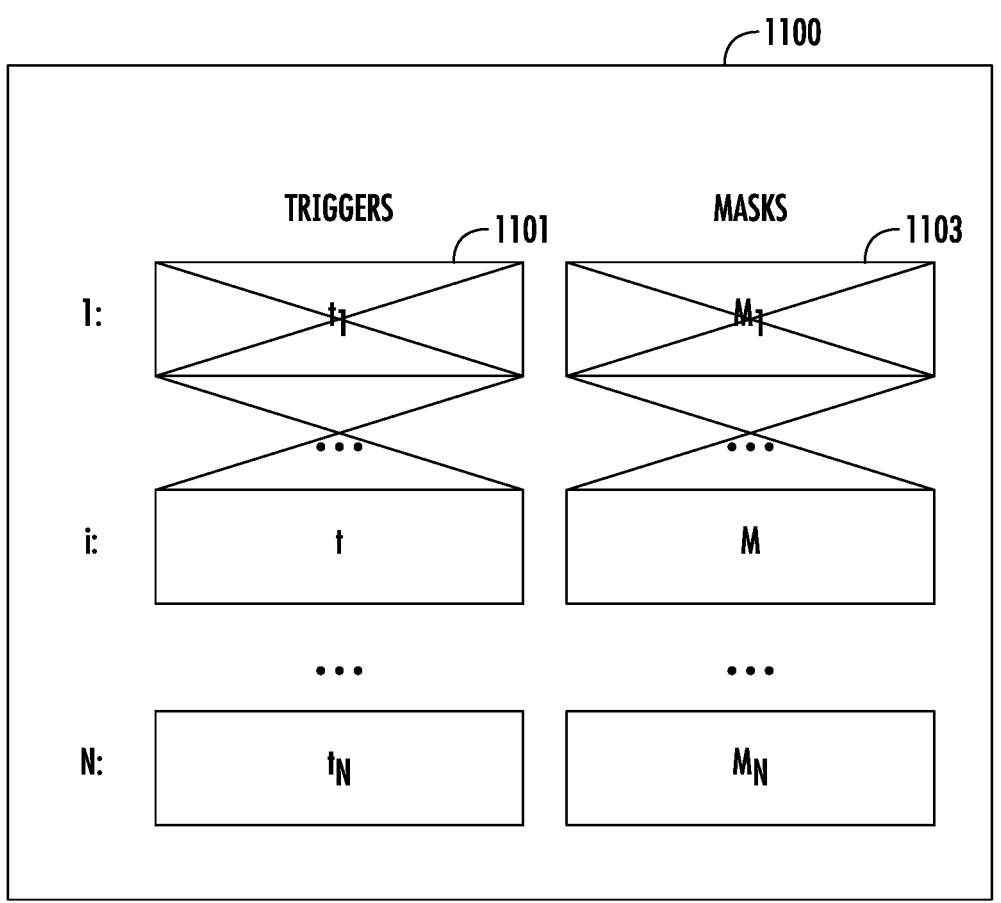
FIG. 11 provides an example schematic block diagram that illustrates example non-volatile data storage media units associated with an example click string generation page in accordance with some embodiments of the present disclosure.

Referring now to FIG. 11, an example schematic block diagram illustrates example non-volatile data storage media units associated with an example click string generation page 1100 in accordance with some embodiments of the present disclosure.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example click string generation pages in accordance with example shown in FIG. 11 may facilitate generating one or more click strings that cannot be regenerated through fault injection attacks, thereby providing various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

In the example shown in FIG. 11, the example click string generation page 1100 may comprise a plurality of non-volatile data storage media units. In some embodiments, similar to the example click string generation page 700 described above in connection with FIG. 7, one click string is generated based on two strings stored in two non-volatile data storage media units that are adjacent to one another on the example click string generation page 1100. In contrast with the example click string generation page 700 described above in connection with FIG. 7, the example click string generation page 1100 shown in FIG. 11 defines pairs of trigger strings and mask strings for generating click strings. For example, a first click string may be generated based on the first original trigger string $t_1$ stored in the first non-volatile data storage media unit 1101 and the first mask string $M_1[1]$ stored in the second non-volatile data storage media unit 1103.

Figure 12A:
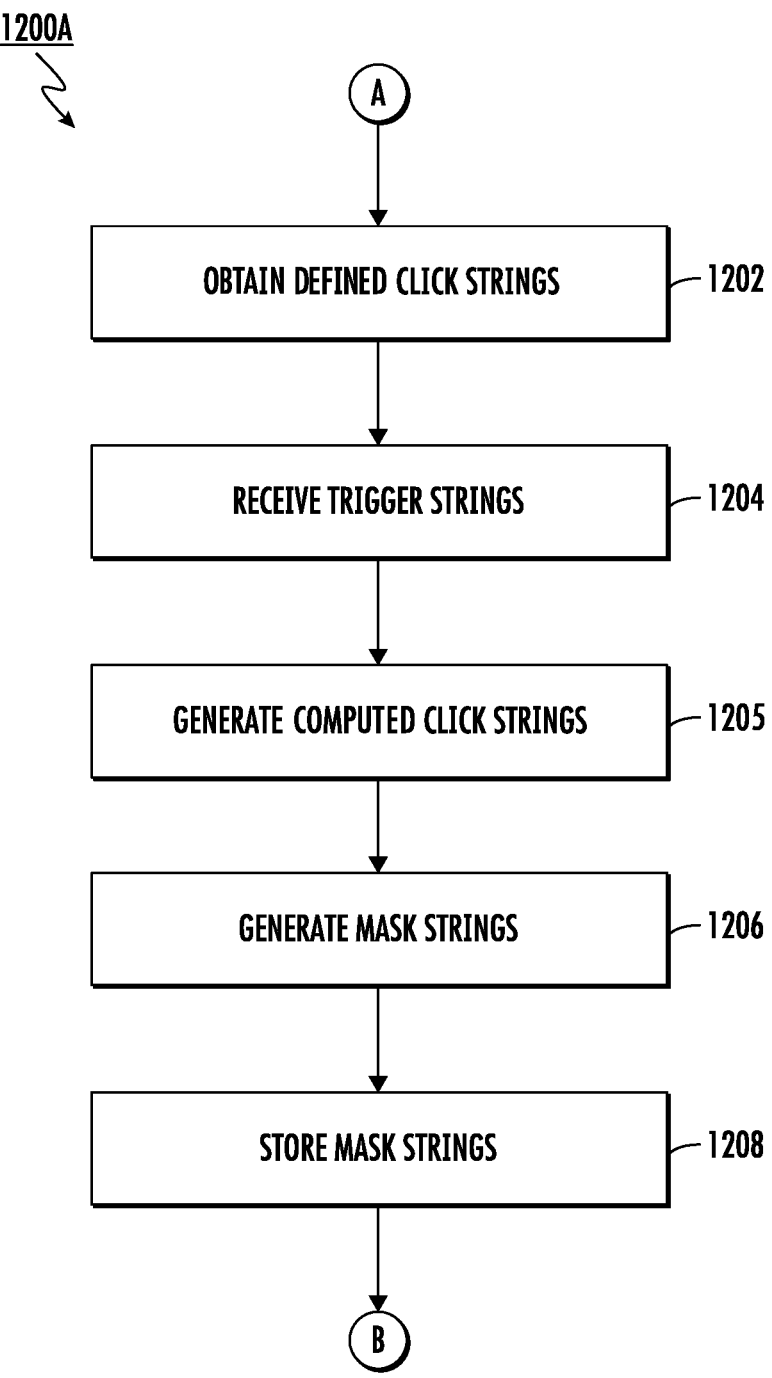
FIG. 12A provides an example flow diagram that illustrates example steps and/or example operations associated with example methods in accordance with some embodiments of the present disclosure.
Figure 12B:
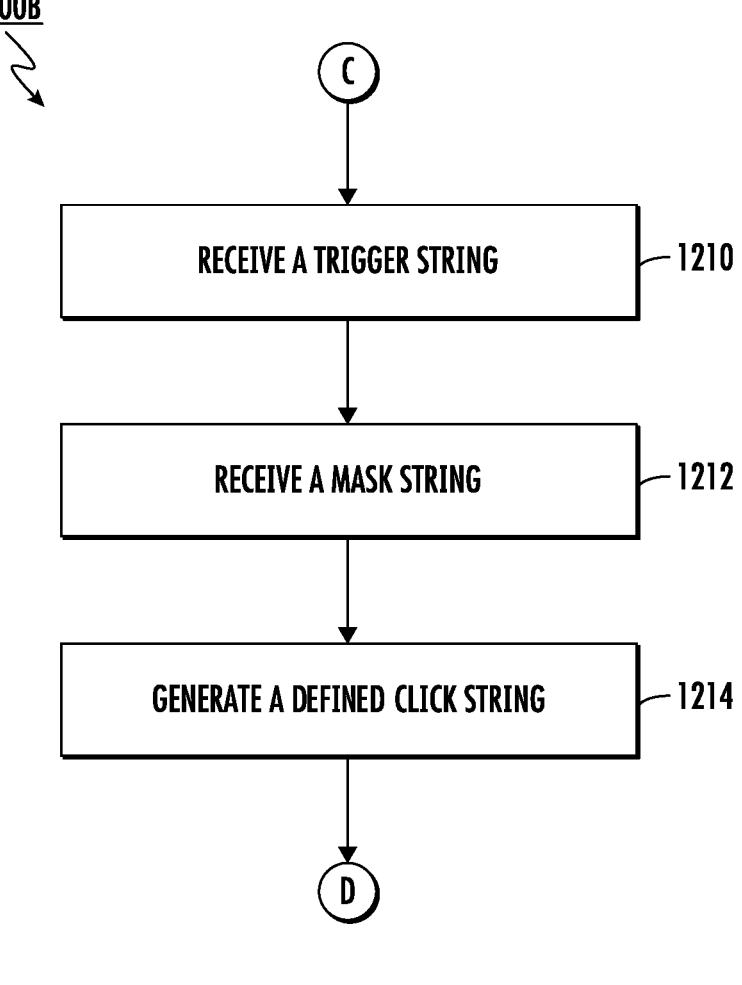
FIG. 12B provides an example flow diagram that illustrates example steps and/or example operations associated with example methods in accordance with some embodiments of the present disclosure.

Referring now to FIG. 12A and FIG. 12B, example flow diagrams that illustrate example steps and/or example operations associated with example methods in accordance with some embodiments of the present disclosure are provided.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example methods in accordance with example flow diagrams shown in FIG. 12A and FIG. 12B may facilitate generating one or more click strings that cannot be regenerated through fault injection attacks. As such, example methods in accordance with example flow diagrams shown in FIG. 12A and FIG. 12B may provide various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

For example, example methods in accordance with the examples shown in FIG. 12A and FIG. 12B may provide capabilities to select or define click string values through the use of mask strings. In particular, FIG. 12A illustrates example steps/operations associated with initializing the click string generation page (for example, in connection with step/operation 1006 described above in connection with FIG. 10). FIG. 12B illustrates example steps/operations associated with obtaining defined click strings based on the click string generation page (for example, in connection with step/operation 1010 described above in connection with FIG. 10).

The example flow diagram 1200A shown in FIG. 12A starts at block A, which is connected to the step/operation 1006 of FIG. 10 where an example processor (such as, but not limited to, the processor 101 of the example apparatus 100 described above in connection with FIG. 1, the processing unit 211 of the example electronic circuit 200 described above in connection with FIG. 2, and/or the like) initializes the click string generation page. As such, the example flow diagram 1200A shown in FIG. 12A illustrates example methods associated with initializing the click string generation page.

In some embodiments, subsequent to and/or in response to block A, some example methods in accordance with some embodiments of the present disclosure proceed to step/operation 1202. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may obtain defined click strings C at step/operation 1202.

In the preset disclosure, the term "defined click strings" refers to click strings having values that are set or defined based on, for example but not limited to, user inputs. For example, a user may input a string of values, and an example processor may generate a defined click string comprising the string of values. In some embodiments, a defined click string may be directly stored in one or more non-volatile data storage media units.

In some embodiments, the example processor may obtain more than one defined click string. As an example, sensitive data may be restricted to a maximum number of times N for accessing. In such an example, the example processor may obtain a total number N of defined click strings C (e.g., $C_1$ to $C_N$).

Referring back to FIG. 12A, subsequent to and/or in response to step/operation 1202, some example methods in accordance with some embodiments of the present disclosure proceed to step/operation 1204. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may receive trigger strings at step/operation 1204. In some embodiments, the trigger strings may be stored in non-volatile data storage media units, similar to various examples described above.

Continuing from the example above, the example processor may receive a total number of N trigger strings that are generated by, for example but not limited to, a random number generator. Continuing in this example, the example processor may store the N trigger strings in N non-volatile data storage media units of an example click string generation page.

Referring back to FIG. 12A, subsequent to and/or in response to step/operation 1204, some example methods in accordance with some embodiments of the present disclosure proceed to step/operation 1205. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate computed click strings c at step/operation 1205.

For example, the example processor may generate the computed click strings c based on the trigger strings received at step/operation 1204 and in accordance with various examples described herein (including, but not limited to, those described in connection with at least FIG. 5, FIG. 6, and FIG. 9).

Referring back to FIG. 12A, subsequent to and/or in response to step/operation 1205, some example methods in accordance with some embodiments of the present disclosure proceed to step/operation 1206. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate mask strings at step/operation 1206.

In some embodiments, the example processor may generate a mask string based on performing an XOR operation between the defined click strings that are obtained at step/operation 1202 and the trigger strings that are received at step/operation 1204. For example, the $i^{th}$ mask string $M_i$ may be generated based on the following equation:

$$M_i = c_i \text{ XOR } C_i.$$

In the above equation, $C_i$ is the $i^{th}$ defined click string that is obtained at step/operation 1202, and $c_i$ is the $i^{th}$ computed click string that is generated at step/operation 1205. While the value of the computed click string may not be known in advance, the mask strings may complement various methods of generating click strings described herein so that the values of the defined click strings can be obtained (additional details of which are described herein in connection with at least FIG. 12B).

Referring back to FIG. 12A, subsequent to and/or in response to step/operation 1206, some example methods in accordance with some embodiments of the present disclosure proceed to step/operation 1208. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may store mask strings at step/operation 1208. For example, as shown in FIG. 11, the first mask string for the first trigger string may be stored in a non-volatile data storage media unit that is adjacent to the non-volatile data storage media unit storing the first trigger string. It is noted that the scope of the present disclosure is not limited to this example.

Continuing the example above, the example processor may store a total number N of mask strings in a total number N of non-volatile data storage media units of the example click string generation page.

Referring back to FIG. 12A, subsequent to and/or in response to step/operation 1208, some example methods in accordance with some embodiments of the present disclosure proceed to block B, which is connected back to step/operation 1006 of FIG. 10.

The example flow diagram 1200B shown in FIG. 12B starts at block C, which is connected to the step/operation 1010 of FIG. 10 where an example processor (such as, but not limited to, the processor 101 of the example apparatus 100 described above in connection with FIG. 1, the processing unit 211 of the example electronic circuit 200 described above in connection with FIG. 2, and/or the like) generates click strings. As such, the example flow diagram 1200B shown in FIG. 12B illustrates example methods associated with generating click strings.

In some embodiments, subsequent to and/or in response to block C, some example methods in accordance with some embodiments of the present disclosure proceed to step/operation 1210. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may receive a trigger string at step/operation 1210.

In some embodiments, the trigger string received at step/operation 1210 of FIG. 12B may be the same as the trigger string received at step/operation 1204 of FIG. 12A.

Subsequent to and/or in response to step/operation 1210, some example methods in accordance with some embodiments of the present disclosure proceed to step/operation 1212. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may receive a mask string at step/operation 1212.

In some embodiments, the mask string received at step/operation 1212 corresponds to the trigger string received at step/operation 1210. As an example, the mask string received at step/operation 1212 may be stored in a non-volatile data storage media unit that is adjacent to the non-volatile data storage media unit storing the trigger string received at step/operation 1210, as shown in FIG. 11. It is noted that the scope of the present disclosure is not limited to this example.

Referring back to FIG. 12B, subsequent to and/or in response to step/operation 1212, some example methods in accordance with some embodiments of the present disclosure proceed to step/operation 1214. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate a defined click string at step/operation 1214.

For example, the example processor may first generate an $i^{th}$ computed click string $c_i$ based on the trigger string received at step/operation 1210 and in accordance with various embodiments described herein (including, but not limited to, at least FIG. 5, FIG. 6 and FIG. 9). In such embodiments, the example processor may then apply the corresponding mask string on the computed click string to determine the $i^{th}$ defined click string $C_i$ in accordance with the following equation:

$$C_i = c_i \, XOR \, M_i$$

In the above equation, $c_i$ is the $i^{th}$ computed trigger string that is generated from the corresponding trigger string received at step/operation 1210, and $M_i$ is the $i^{th}$ mask string. As illustrated in the above equation, the computed mask strings $M_i$ allows the desired values of the defined click strings $C_i$ to be obtained.

Referring back to FIG. 12B, subsequent to and/or in response to step/operation 1214, some example methods in accordance with some embodiments of the present disclosure proceed to block D, which is connected back to step/operation 1010 of FIG. 10.

Figure 13A:
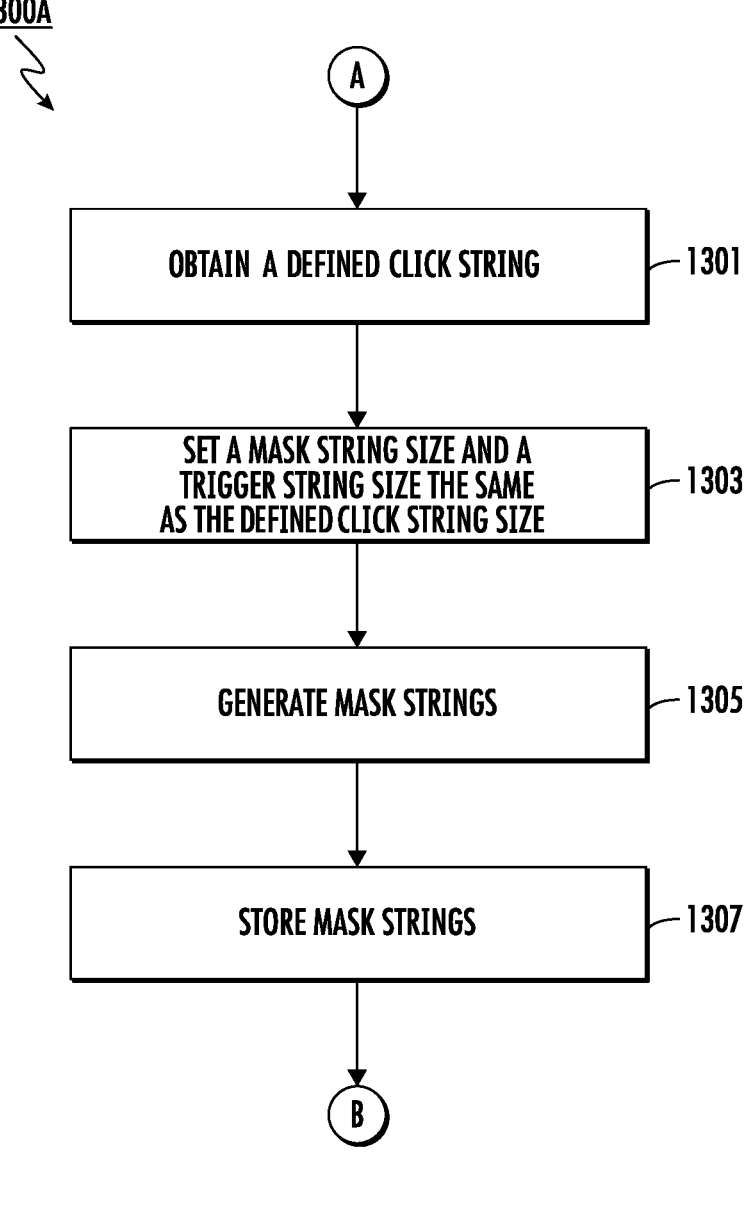
FIG. 13A provides an example flow diagram that illustrates example steps and/or example operations associated with example methods in accordance with some embodiments of the present disclosure.
Figure 13B:
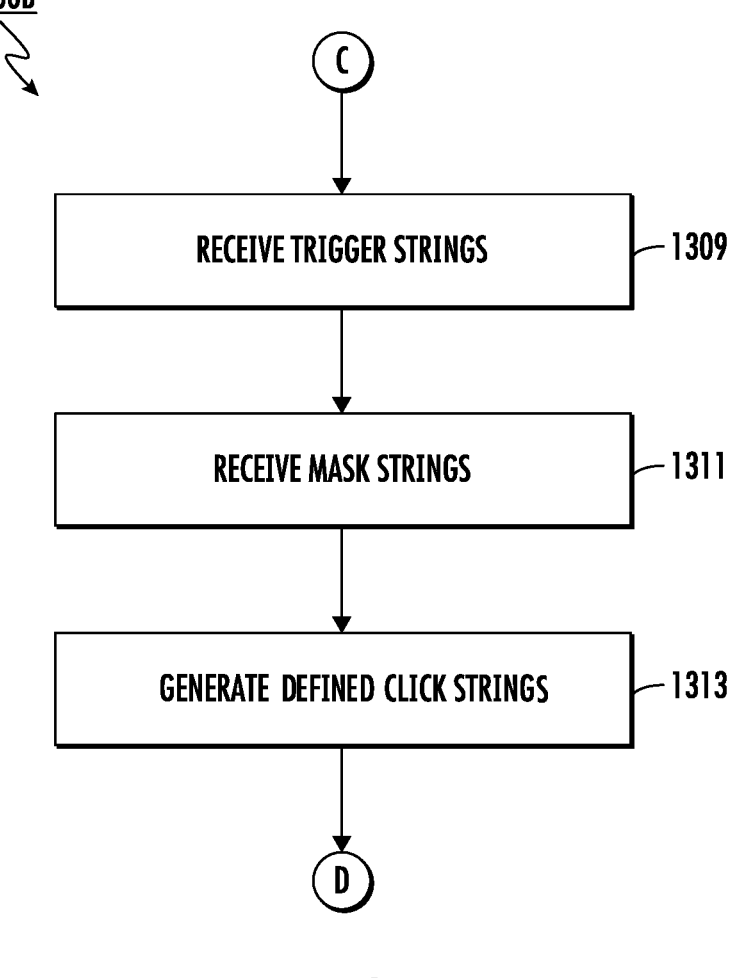
FIG. 13B provides an example flow diagram that illustrates example steps and/or example operations associated with example methods in accordance with some embodiments of the present disclosure.

Referring now to FIG. 13A and FIG. 13B, example flow diagrams that illustrate example steps and/or example operations associated with example methods in accordance with some embodiments of the present disclosure are provided. In particular, FIG. 13A and FIG. 13B illustrate example methods for generating multiple sharing of the same click string.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example methods in accordance with example flow diagrams shown in FIG. 13A and FIG. 13B may facilitate generating one or more click strings that cannot be regenerated through fault injection attacks. As such, example methods in accordance with example flow diagrams shown in FIG. 13A and FIG. 13B may provide various technical benefits and advantages such as, but not limited to, enhancing protection of data against unauthorized access and manipulation (for example, but not limited to, through fault injection attacks) and improving data security by restricting access to secret/sensitive data and/or information that is stored in the computing device.

The example flow diagram 1300A shown in FIG. 13A starts at block A, which is connected to the step/operation 1006 of FIG. 10 where an example processor (such as, but not limited to, the processor 101 of the example apparatus 100 described above in connection with FIG. 1, the processing unit 211 of the example electronic circuit 200 described above in connection with FIG. 2, and/or the like) initializes the click string generation page. As such, the example flow diagram 1300A shown in FIG. 13A illustrates example methods associated with initializing the click string generation page.

In some embodiments, subsequent to and/or in response to block A, some example methods in accordance with some embodiments of the present disclosure proceed to step/operation 1301. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may obtain a defined click string C at step/operation 1301.

In some embodiments, step/operation 1301 of FIG. 13A is similar to step/operation 1202 of FIG. 12A.

Referring back to FIG. 13A, subsequent to and/or in response to step/operation 1301, some example methods in accordance with some embodiments of the present disclosure proceed to step/operation 1303. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may set a mask string size associated with mask strings and a trigger string size associated with trigger strings. In some embodiments, the mask string size and the trigger string size are the same as the click string size of the defined click string obtained at step/operation 1301.

For example, the click string size associated with the defined click string may be 32 bits. In such an example, the mask string size associated with the mask string is 32 bits, and the trigger string size associated with the trigger string is also 32 bits.

Referring back to FIG. 13A, subsequent to and/or in response to step/operation 1303, some example methods in accordance with some embodiments of the present disclosure proceed to step/operation 1305. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate mask strings at step/operation 1305.

In some embodiments, the example processor may generate a computed click string based on a trigger string (for example, similar to those described above in connection with step/operation 1205 of FIG. 12A), and then generate a mask string based on performing an XOR operation between the defined click string C that have been obtained at step/operation 1301 and computed click string. For example, the $i^{th}$ mask string $M_i$ may be generated based on the following equation:

$$M_i = c_i \, XOR \, C.$$

In the above equation, $c_i$ is the $i^{th}$ computed click string that is generated from the $i^{th}$ trigger string in accordance with various examples of the present disclosure (including, but not limited to, those shown in FIG. 5, FIG. 6, and FIG. 9), and C is the defined click string obtained at step/operation 1301 (which may, for example, comprise an encryption key). As illustrated in this example, multiple mask strings are generated based on the same defined click string C (which may be the encryption key), thereby facilitating creating multiple copies of the same click string C.

Referring back to FIG. 13A, subsequent to and/or in response to step/operation 1305, some example methods in accordance with some embodiments of the present disclosure proceed to step/operation 1307. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may store mask strings at step/operation 1307.

In some embodiments, step/operation 1307 of FIG. 13A is similar to step/operation 1208 of FIG. 12A.

Referring back to FIG. 13A, subsequent to and/or in response to step/operation 1307, some example methods in accordance with some embodiments of the present disclosure proceed to block B, which is connected back to step/operation 1006 of FIG. 10.

The example flow diagram 1300B shown in FIG. 13B starts at block C, which is connected to the step/operation 1010 of FIG. 10 where an example processor (such as, but not limited to, the processor 101 of the example apparatus 100 described above in connection with FIG. 1, the processing unit 211 of the example electronic circuit 200 described above in connection with FIG. 2, and/or the like) generates click strings. As such, the example flow diagram 1300B shown in FIG. 13B illustrates example methods associated with generating click strings.

In some embodiments, subsequent to and/or in response to block C, some example methods in accordance with some embodiments of the present disclosure proceed to step/operation 1309. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may receive trigger strings at step/operation 1309.

In some embodiments, step/operation 1309 of FIG. 13B is similar to step/operation 1210 of FIG. 12B.

Referring back to FIG. 13B, subsequent to and/or in response to step/operation 1309, some example methods in accordance with some embodiments of the present disclosure proceed to step/operation 1311. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may receive mask strings at step/operation 1311.

In some embodiments, step/operation 1311 of FIG. 13B is similar to step/operation 1212 of FIG. 12B.

Referring back to FIG. 13B, subsequent to and/or in response to step/operation 1311, some example methods in accordance with some embodiments of the present disclosure proceed to step/operation 1313. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate the defined click strings at step/operation 1313.

In some embodiments, step/operation 1313 of FIG. 13B is similar to step/operation 1214 of FIG. 12B.

In some embodiments, the example processor may generate the defined click string as a matrix (ci, Mi) instead of performing an XOR operation as those described above in connection with FIG. 12A and FIG. 12B.

Referring back to FIG. 13B, subsequent to and/or in response to step/operation 1313, some example methods in accordance with some embodiments of the present disclosure proceed to block D, which is connected back to step/operation 1010 of FIG. 10.

As illustrated in the example methods shown in FIG. 13A and FIG. 13B, various embodiments of the present disclosure provide technical benefits and advantages such as, but not limited to, improving data ratification. For example, if the global limit ratification defines a maximum data access limit N using an encryption key K, example methods of the present disclosure may initialize a click string generation page based on generating N trigger strings and N mask strings that would create the same defined click string C (which may set based on the encryption key K) as shown in FIG. 13A.

Continuing in the above example, each time an authorized data access request is received, the example processor may determine whether there is at least one value of trigger string remaining on the click string generation page. If there is at least one value of trigger string remaining on the click string generation page, the example processor generates a click string based on one of the N trigger strings and one of the N mask strings. As described above, each time a click string is generated, the trigger string and the mask string that are used for generating such click string are destroyed and cannot be re-generated. As such, by limiting the number of trigger strings and the number of mask strings to N, various embodiments of the present disclosure limit the number of data access to N. If there is no more trigger string remaining on the click string generation page, the example processor determines that the maximum data access limit has been reached, and will deny the data access request.

Figure 14A:
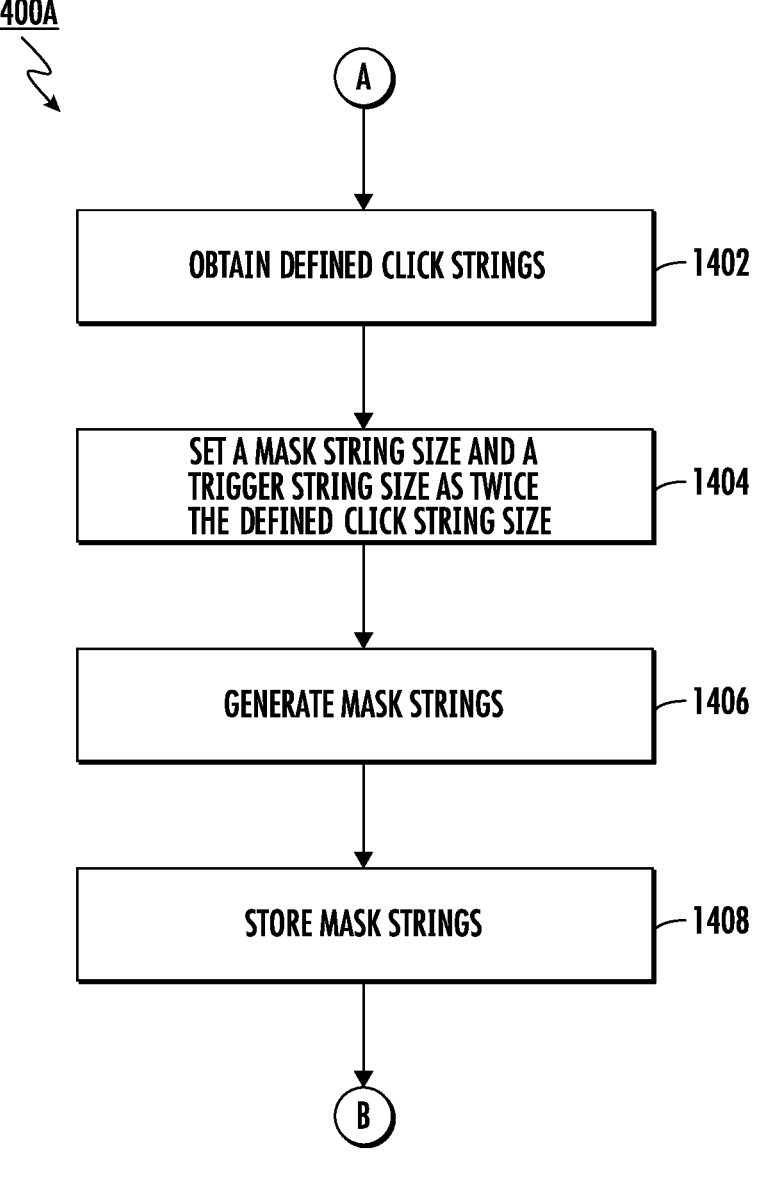
FIG. 14A provides an example flow diagram that illustrates example steps and/or example operations associated with example methods in accordance with some embodiments of the present disclosure.
Figure 14B:
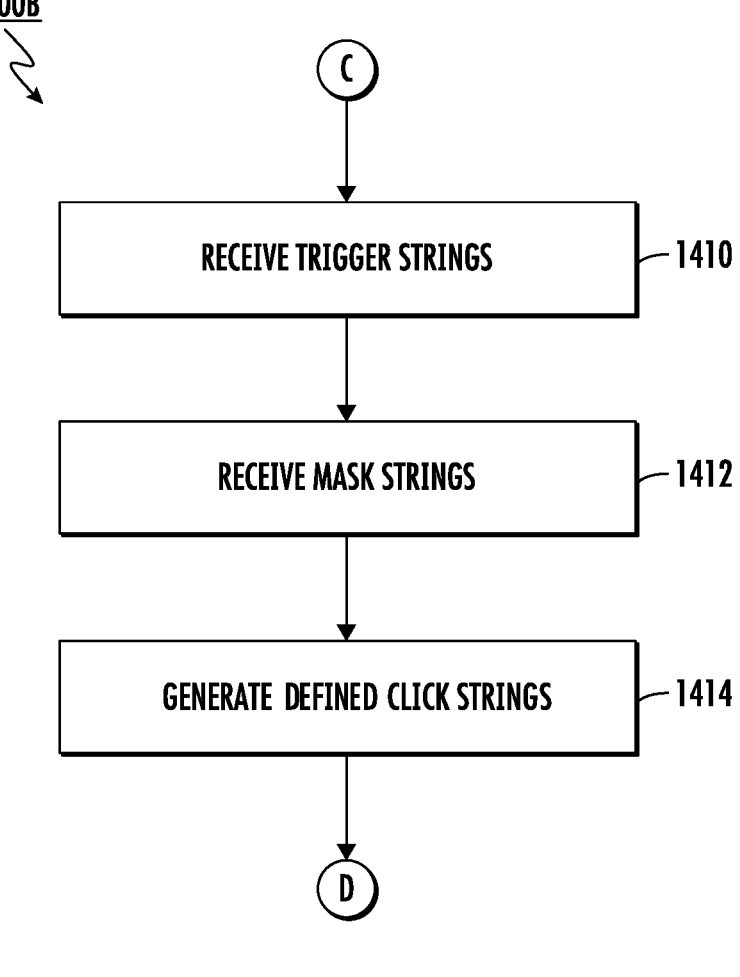
FIG. 14B provides an example flow diagram that illustrates example steps and/or example operations associated with example methods in accordance with some embodiments of the present disclosure.

Referring now to FIG. 14A and FIG. 14B, example flow diagrams that illustrate example steps and/or example operations associated with example methods in accordance with some embodiments of the present disclosure are provided.

As described above, there are technical challenges, deficiencies, and problems associated with data processing such as, but not limited to, security risks of unauthorized access of secret/sensitive data through fault injection attacks. Various embodiments of the present disclosure overcome the above technical challenges and difficulties, and provide various technical improvements and advantages. For example, example methods in accordance with example flow diagrams shown in FIG. 14A and FIG. 14B may facilitate generating one or more click strings that cannot be regenerated through fault injection attacks. As such, example methods in accordance with example flow diagrams shown in FIG. 14A and FIG. 14B may provide various technical benefits and advantages such as, but not limited to, enhancing protection of data against unauthorized access and manipulation (for example, but not limited to, through fault injection attacks), strengthening usage ratification of sensitive material and improving data security by restricting access to secret/sensitive data and/or information that is stored in the computing device.

The example flow diagram 1400A shown in FIG. 14A starts at block A, which is connected to the step/operation 1006 of FIG. 10 where an example processor (such as, but not limited to, the processor 101 of the example apparatus 100 described above in connection with FIG. 1, the processing unit 211 of the example electronic circuit 200 described above in connection with FIG. 2, and/or the like) initializes the click string generation page. As such, the example flow diagram 1400A shown in FIG. 14A illustrates example methods associated with initializing the click string generation page.

In some embodiments, subsequent to and/or in response to block A, some example methods in accordance with some embodiments of the present disclosure proceed to step/operation 1402. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may obtain defined click strings at step/operation 1402.

In some embodiments, the example processor may set a total number N of defined click strings (for example, from $C_1$ to $C_N$) that are concatenations of a random value (for example, from a random number generator) and a value C (for example, an encryption key) masked with that random value. For example, the $i^{th}$ defined click string $C_i$ may be generated based on the following equation:

$$C_i = Rndi \| (C\ XOR\ Rndi)$$

In the equation above, Rndi is a random value.

Referring back to FIG. 14A, subsequent to and/or in response to step/operation 1402, some example methods in accordance with some embodiments of the present disclosure proceed to step/operation 1404. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may set a mask string size of the mask string and a trigger string size of the trigger string as twice the click string size of the defined click string at step/operation 1404.

For example, the click string size associated with the defined click string may be 16 bits. In such an example, the mask string size associated with the mask string is 32 bits, and the trigger string size associated with the trigger string is also 32 bits.

Referring back to FIG. 14A, subsequent to and/or in response to step/operation 1404, some example methods in accordance with some embodiments of the present disclosure proceed to step/operation 1406. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate mask strings at step/operation 1406.

In some embodiments, step/operation 1406 of FIG. 14A is similar to step/operation 1305 of FIG. 13A and step/operation 1206 of FIG. 12A.

Referring back to FIG. 14A, subsequent to and/or in response to step/operation 1406, some example methods in accordance with some embodiments of the present disclosure proceed to step/operation 1408. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may store mask strings at step/operation 1408.

In some embodiments, step/operation 1408 of FIG. 14A is similar to step/operation 1307 of FIG. 13A and step/operation 1208 of FIG. 12A.

Referring back to FIG. 14A, subsequent to and/or in response to step/operation 1408, some example methods in accordance with some embodiments of the present disclosure proceed to block B, which is connected back to step/operation 1006 of FIG. 10.

The example flow diagram 1400B shown in FIG. 14B starts at block C, which is connected to the step/operation 1010 of FIG. 10 where an example processor (such as, but not limited to, the processor 101 of the example apparatus 100 described above in connection with FIG. 1, the processing unit 211 of the example electronic circuit 200 described above in connection with FIG. 2, and/or the like) generates click strings. As such, the example flow diagram 1400B shown in FIG. 14B illustrates example methods associated with generating click strings.

In some embodiments, subsequent to and/or in response to block C, some example methods in accordance with some embodiments of the present disclosure proceed to step/operation 1410. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may receive trigger strings at step/operation 1410.

In some embodiments, step/operation 1410 of FIG. 14B is similar to step/operation 1210 of FIG. 12B and step/operation 1309 of FIG. 13B.

Referring back to FIG. 14B, subsequent to and/or in response to step/operation 1410, some example methods in accordance with some embodiments of the present disclosure proceed to step/operation 1412. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may receive mask strings at step/operation 1412.

In some embodiments, step/operation 1412 of FIG. 14B is similar to step/operation 1212 of FIG. 12B and step/operation 1311 of FIG. 13B.

Referring back to FIG. 14B, subsequent to and/or in response to step/operation 1412, some example methods in accordance with some embodiments of the present disclosure proceed to step/operation 1414. In some embodiments, an example processor (such as, but not limited to, the processor 101 of the example apparatus 100 described above in connection with FIG. 1, the processing unit 211 of the example electronic circuit 200 described above in connection with FIG. 2, and/or the like) may generate defined click strings at step/operation 1414.

In some embodiments, step/operation 1414 of FIG. B is similar to step/operation 1214 of FIG. 12B and step/operation 1313 of FIG. 13B.

Referring back to FIG. 14B, subsequent to and/or in response to step/operation 1414, some example methods in accordance with some embodiments of the present disclosure proceed to block D, which is connected back to step/operation 1010 of FIG. 10.

While this detailed description has set forth some embodiments of the present invention, the appended claims also cover other embodiments of the present invention which may differ from the described embodiments according to various modifications and improvements. For example, in some embodiments, the first non-volatile data storage media unit (storing the first original trigger string) and the second non-volatile data storage media unit (storing the second original trigger string) may not be adjacent to one another and/or may not be on the same memory page.

Within the appended claims, unless the specific term "means for" or "step for" is used within a given claim, it is not intended that the claim be interpreted under 35 U.S.C. 112, paragraph 6.

The invention claimed is:

1. A method for data encryption based on using a click string generation page that comprises a first non-volatile data storage media unit storing a first original trigger string, the method comprising:

generating, by a processor, a first overprogrammed trigger string comprising a result of an AND operation between a plurality of first original trigger strings by overprogramming the first non-volatile data storage media unit using the first original trigger string;

generating, by the processor, a first click string by performing a first computation operation using the first original trigger string and the first overprogrammed trigger string; and generating, by the processor, encrypted data storage media by performing an encryption operation on unencrypted data storage media using the first click string.

2. The method of claim 1, wherein the click string generation page comprises a second non-volatile data storage media unit that stores a second original trigger string.

3. The method of claim 2, wherein generating the first overprogrammed trigger string comprises:

receiving, by the processor, the second original trigger string from the second non-volatile data storage media unit; and overprogramming, by the processor, the first non-volatile data storage media unit using the second original trigger string.

4. The method of claim 2, further comprising:

applying a mask string on the first click string.

5. The method of claim 2, wherein generating the encrypted data storage media comprises:

generating, by the processor, a second overprogrammed trigger string by overprogramming the second non-volatile data storage media unit;

generating, by the processor, a second click string by performing a second computation operation based at least in part on the second original trigger string and the second overprogrammed trigger string; and generating, by the processor, the encrypted data storage media by performing the encryption operation on the unencrypted data storage media based on the first click string and the second click string.

6. The method of claim 5, wherein generating the second overprogrammed trigger string comprises:

prior to generating the first overprogrammed trigger string, receiving, by the processor, the first original trigger string from the first non-volatile data storage media unit; and overprogramming, by the processor, the second non-volatile data storage media unit using the first original trigger string.

7. The method of claim 5, further comprising:

applying a mask string on the second click string.

8. A computing apparatus for data encryption using a click string generation page that comprises a first non-volatile data storage media unit storing a first original trigger string, the computing apparatus comprising memory and one or more processors communicatively coupled to the memory, the one or more processors configured to:

generate a first overprogrammed trigger string comprising a result of an AND operation between a plurality of first original trigger strings by overprogramming the first non-volatile data storage media unit using the first original trigger string;

generate a first click string by performing a first computation operation using the first original trigger string and the first overprogrammed trigger string; and generate encrypted data storage media by performing an encryption operation on unencrypted data storage media using the first click string.

9. The computing apparatus of claim 8, wherein the click string generation page comprises a second non-volatile data storage media unit that stores a second original trigger string.

10. The computing apparatus of claim 9, wherein, when generating the first overprogrammed trigger string, the one or more processors are configured to:

receive the second original trigger string from the second non-volatile data storage media unit; and overprogram the first non-volatile data storage media unit using the second original trigger string.

11. The computing apparatus of claim 9, wherein the one or more processors are configured to:

apply a mask string on the first click string.

12. The computing apparatus of claim 9, wherein, when generating the encrypted data storage media, the one or more processors are configured to:

generate a second overprogrammed trigger string by overprogramming the second non-volatile data storage media unit;

generate a second click string by performing a second computation operation based at least in part on the second original trigger string and the second overprogrammed trigger string; and generate the encrypted data storage media by performing the encryption operation on the unencrypted data storage media based on the first click string and the second click string.

13. The computing apparatus of claim 12, wherein, when generating the second overprogrammed trigger string, the one or more processors are configured to:

prior to generating the first overprogrammed trigger string, receive the first original trigger string from the first non-volatile data storage media unit; and overprogram the second non-volatile data storage media unit using the first original trigger string.

14. The computing apparatus of claim 12, wherein the one or more processors are configured to:

apply a mask string on the second click string.

15. One or more non-transitory computer-readable storage media for data encryption using a click string generation page that comprises a first non-volatile data storage media unit storing a first original trigger string, the one or more non-transitory computer-readable storage media including instructions that, when executed by one or more processors, cause the one or more processors to:

generate a first overprogrammed trigger string comprising a result of an AND operation between a plurality of first original trigger strings by overprogramming the first non-volatile data storage media unit using the first original trigger string;

generate a first click string by performing a first computation operation using the first original trigger string and the first overprogrammed trigger string; and generate encrypted data storage media by performing an encryption operation on unencrypted data storage media using the first click string.

16. The one or more non-transitory computer-readable storage media of claim 15, wherein the click string generation page comprises a second non-volatile data storage media unit that stores a second original trigger string.

17. The one or more non-transitory computer-readable storage media of claim 16, wherein, when generating the first overprogrammed trigger string, the instructions cause the one or more processors to:

receive the second original trigger string from the second non-volatile data storage media unit; and overprogram the first non-volatile data storage media unit using the second original trigger string.

18. The one or more non-transitory computer-readable storage media of claim 16, wherein the instructions cause the one or more processors to:

apply a mask string on the first click string.

19. The one or more non-transitory computer-readable storage media of claim 16, wherein, when generating the encrypted data storage media, the instructions cause the one or more processors to:

generate a second overprogrammed trigger string by overprogramming the second non-volatile data storage media unit;

generate a second click string by performing a second computation operation based at least in part on the second original trigger string and the second overprogrammed trigger string; and generate the encrypted data storage media by performing the encryption operation on the unencrypted data storage media based on the first click string and the second click string.

20. The one or more non-transitory computer-readable storage media of claim 19, wherein, when generating the second overprogrammed trigger string, the instructions cause the one or more processors to:

prior to generating the first overprogrammed trigger string, receive the first original trigger string from the first non-volatile data storage media unit; and overprogram the second non-volatile data storage media unit using the first original trigger string.

* * * * *